US008775242B2

(12) United States Patent
Tavares et al.

(10) Patent No.: US 8,775,242 B2
(45) Date of Patent: Jul. 8, 2014

(54) SYSTEMS AND METHODS FOR ANALYZING THE EFFECTIVENESS OF A PROMOTION

(75) Inventors: Silvio Tavares, Atlanta, GA (US); Susan Fahy, Melville, NY (US); Dennis Carlson, Atlanta, GA (US)

(73) Assignee: First Data Corporation, Greenwood Village, CO (US)

( * ) Notice: Subject to any disclaimer, the term of this patent is extended or adjusted under 35 U.S.C. 154(b) by 17 days.

(21) Appl. No.: 13/406,402

(22) Filed: Feb. 27, 2012

(65) Prior Publication Data

US 2012/0185311 A1   Jul. 19, 2012

Related U.S. Application Data

(63) Continuation-in-part of application No. 13/253,756, filed on Oct. 5, 2011, which is a continuation-in-part of application No. 13/032,878, filed on Feb. 23, 2011, which is a continuation-in-part of application No. 12/758,397, filed on Apr. 12, 2010, now Pat. No. 8,195,500.

(51) Int. Cl.
*G06Q 30/00* (2012.01)
*G06Q 30/02* (2012.01)

(52) U.S. Cl.
CPC ............................... *G06Q 30/0211* (2013.01); *G06Q 30/0207* (2013.01)
USPC ...................................... 705/14.13; 705/14.1

(58) Field of Classification Search
USPC ...................................................... 705/14.13
See application file for complete search history.

(56) References Cited

U.S. PATENT DOCUMENTS

| | | | |
|---|---|---|---|
| 5,500,513 A | 3/1996 | Langhans et al. | |
| 5,933,813 A * | 8/1999 | Teicher et al. | 705/26.1 |
| 6,151,582 A | 11/2000 | Huang et al. | |
| 6,434,534 B1 * | 8/2002 | Walker et al. | 705/14.13 |
| 6,633,851 B1 | 10/2003 | Engler et al. | |
| 7,287,000 B2 * | 10/2007 | Boyd et al. | 705/14.43 |
| 2001/0016819 A1 | 8/2001 | Kolls | |
| 2002/0116252 A1 | 8/2002 | Saito et al. | |
| 2002/0161779 A1 * | 10/2002 | Brierley et al. | 707/103 R |
| 2003/0125011 A1 * | 7/2003 | Campbell | 455/406 |
| 2004/0073485 A1 * | 4/2004 | Liu et al. | 705/14 |

(Continued)

OTHER PUBLICATIONS

Rourke et al., "Adjusting Fluid Milk Sales Data for Calendar Composition", Agricultural Marketing Service, United States Department of Agriculture, Jun. 2002, found on line at ams.usda.gov/AMSv1.0/getfile?dDocName=STELDEV3023272.*

(Continued)

*Primary Examiner* — John G Weiss
*Assistant Examiner* — Scott C Anderson
(74) *Attorney, Agent, or Firm* — Kilpatrick Townsend & Stockton LLP

(57) ABSTRACT

The invention provides systems and methods for collecting point-of-sale (POS) data, and then using this data to determine the effectiveness of a given promotion. The transaction data includes a merchant identifier for each of the merchants and a transaction amount for each transaction involving the merchants. One of the merchants is a promotion merchant that is offering a promotion involving transactions made with the merchant. A portion of the transaction data is aggregated into control merchant aggregated data involving control merchants, where the control merchant aggregated data comprises transaction data obtained other than from the promotion merchant. A characteristic of the purchases is calculated, both for transactions involving the promotion merchant and for the control merchants.

28 Claims, 19 Drawing Sheets

(56) References Cited

U.S. PATENT DOCUMENTS

| | | |
|---|---|---|
| 2004/0093268 A1* | 5/2004 | Ramchandani et al. ........ 705/14 |
| 2004/0225556 A1 | 11/2004 | Willen et al. |
| 2004/0230472 A1 | 11/2004 | Venkat et al. |
| 2005/0090911 A1 | 4/2005 | Ingargiola et al. |
| 2007/0083430 A1 | 4/2007 | Summer |
| 2008/0033587 A1 | 2/2008 | Kurita et al. |
| 2008/0262900 A1 | 10/2008 | Duffy et al. |
| 2008/0270363 A1 | 10/2008 | Hunt et al. |
| 2009/0048884 A1* | 2/2009 | Olives et al. ...................... 705/7 |
| 2009/0063274 A1* | 3/2009 | Dublin et al. ................... 705/14 |
| 2009/0299536 A1 | 12/2009 | Beekhuis |
| 2010/0287029 A1 | 11/2010 | Dodge et al. |
| 2011/0035278 A1 | 2/2011 | Fordyce, III et al. |
| 2011/0035280 A1 | 2/2011 | Fordyce, III et al. |
| 2011/0087519 A1 | 4/2011 | Fordyce, III et al. |
| 2011/0087546 A1 | 4/2011 | Fordyce, III et al. |
| 2011/0087547 A1 | 4/2011 | Amaro et al. |
| 2011/0087550 A1 | 4/2011 | Fordyce, III et al. |
| 2011/0093327 A1 | 4/2011 | Fordyce, III et al. |
| 2011/0093335 A1 | 4/2011 | Fordyce, III et al. |
| 2011/0251870 A1 | 10/2011 | Tavares et al. |
| 2011/0251907 A1 | 10/2011 | Tavares et al. |

OTHER PUBLICATIONS

Lucas et al., "Measuring the effectiveness of casino promotions", Hospitality Management No. 21, 2002, pp. 189-202.*
International Search Report and Written Opinion of PCT/US2011/032102 mailed on Oct. 25, 2011, 11 pages.

* cited by examiner

SYSTEMS AND METHODS FOR ANALYZING THE EFFECTIVENESS OF A PROMOTION

CROSS-REFERENCES TO RELATED APPLICATIONS

This application is a continuation in part application and claims the benefit of copending U.S. application Ser. No. 13/253,756, filed Oct. 5, 2011, which is a continuation in part application and claims the benefit of copending U.S. patent application Ser. No. 13/032,878, filed Feb. 23, 2011, which is a continuation in part application and claims the benefit of copending U.S. patent application Ser. No. 12/758,397, filed Apr. 12, 2010. The complete disclosures of all these references are herein incorporated by reference.

FIELD

The invention relates, in general, to calculating the return on marketing or advertisement investments and, more particularly, to the effectiveness of a promotion by using aggregated point-of-sale data.

BACKGROUND OF THE INVENTION

Manufacturers and merchants have long attempted to determine the return on their marketing investments. For example, if a company pays a certain amount to run an advertisement in a newspaper or on a web site, the company would like to have accurate data indicating the increase in sales directly attributable to that advertisement. For a variety of reasons, this type of return data is very difficult to calculate with any degree of accuracy. This is even more difficult when the advertisement is in the form of a discount or coupon.

Hence, this invention relates to techniques for calculating such returns on marketing investments. A summary of such techniques are provided hereinafter.

BRIEF SUMMARY OF THE INVENTION

The invention provides systems and methods for collecting point-of-sale (POS) data, and then using this data to determine the effectiveness of a given promotion. By collecting transaction data at the POS that includes a merchant identifier and a promotion identifier (among other data), a variety calculations may be performed to determine the effectiveness of the promotion.

For example, in one embodiment a method for calculating the effectiveness of a promotion utilizes a host computer system that receives transaction data from a plurality of point of sale terminals. The transaction data includes purchases made by consumers both with and without the use of a promotional identifier that is associated with a promotion. The host computer system calculates a characteristic of the purchases, both for transaction data that includes promotional identifiers and that does not include promotional identifiers. The calculated characteristic is indicative of the effectiveness of the promotion, such as, for example, the total amount of the purchase during the shopping visit. Further, an output is provided showing a comparison of the calculation. In this way, transaction data collected from point of sale terminals may be used track redemptions of promotions in order to determine the effectiveness of a given promotion.

As an example, the transaction data received from the point of sale terminals may be associated with a single merchant and includes a merchant identifier. This permits a merchant to determine the purchasing behavior of consumers both with and without the use of a promotion. Merely by way of example, the merchant may be able to receive a report on an average transaction amount per purchase where the promotional identifier was used verses the average transaction amount for purchases where the promotional identifier was not used. In an alternative aspect, the transaction data received from the point of sale terminals may be associated with a plurality of merchants. This permits the merchant to see a report on consumer behavior when redeeming a promotion versus a similarly situated merchant where the promotion was not offered. Or, the comparison could be with a similarly situated merchant where the same promotion was offered as well.

As another example, in cases where a calculation is made as to the average transaction amount per purchase, a report may be generated showing the average transaction amount for purchases where the promotional identifier was used during one time period verses the average transaction amount for purchases where the promotional identifier was used during a second time period. For instance, a merchant could see the effectiveness of the same promotion offered the previous quarter, half year or a year.

In one specific example, the promotion may comprise a pre-paid discount, and the host computer system is used to collect purchase information associated with the purchase of any pre-paid discounts, including financial accounts used to pay for the pre-paid discounts. In this way, comparisons may be performed to determine behavior relating to both the purchase of the pre-paid discount and the redemption of such pre-paid discounts. For instance, reports may be generated to show the average time to redeem, whether the same accounts that were used to purchase the discounts were used for redemptions, average redemption spend versus other characteristics of the purchaser, such as average account balance, average credit limit and the like.

In one aspect, the pre-paid discount is delivered in a certain form, and the report shows a profit made on the pre-paid discount based on the form of delivery. A report may also show the frequency of purchases made over time using the promotional identifiers. Still further, a report may the frequency of return visits to the same merchant where the purchases were made using the promotional identifier and for visits to similar merchants where the promotional identifiers were not used.

In a further aspect, a report may show the average amount spent during return visits to the same merchant where the purchase was made using the promotional identifier versus purchases made during visits to similarly situated merchants. A report may also show the total amount spent for purchases made at a merchant location where the promotional identifier was used. Further, a report may show how many people who made purchases using the promotional identifier at a given merchant do not make any purchases with different merchants in a similar industry.

In cases where the promotion comprises a pre-paid discount, a report may be generated showing the average length of time between the purchase of the pre-paid discounts and purchases made using the promotional identifier.

In another embodiment, the effectiveness of a promotion may be calculated by collecting transaction data from a plurality of point of sale terminals, where the transaction data includes purchases made by consumers using a promotional identifier that is associated with a promotion, and at least one merchant identifier. A report may be generated showing a characteristic of the purchases that is indicative of the effectiveness of the promotion. For example, the characteristic may comprise the number of promotional identifiers redeemed over a given time, redemption locations, redemption times, information on consumers making the redemptions, account types used in making the redemptions, and the like. The method may be used with a variety of promotions, such as those involving pre-paid discounts, coupons, loyalty programs, and the like.

In a further embodiment, a system for reporting the effectiveness of a promotion according to point-of-sale (POS) data comprises an aggregation subsystem communicatively coupled with a POS network comprising a plurality of POS terminals. The aggregation subsystem is configured to aggregate POS datasets from the plurality of POS terminals, each POS terminal being associated with terminal data that is associated with at least one of a plurality of merchant identifiers. Also, each POS terminal is configured to collect transaction data as a function of transactions effectuated via the POS terminal, the POS dataset for each of the POS terminals comprising the terminal data and the transaction data, including a promotional identifier used when making a purchase based on the promotion. A data storage subsystem is communicatively coupled with the aggregation subsystem and is configured to store the aggregated POS data from the plurality of POS terminals. A promotional analysis processing subsystem is communicatively coupled with the POS data store and is configured to identify promotion redemption data, where the promotional data comprises purchases that were made using a promotional identifier and purchases made without the use of the promotional identifier. A reporting subsystem is communicatively coupled with the promotional analysis processing subsystem and is configured to output graphical report data as a function of the promotional data in response to the reporting request. The graphical report data is configured to be displayed on a user device. Various reports similar to those mentioned above may be generated by the system.

A further embodiment provides a computerized method for calculating the effectiveness of a promotion. The method utilizes a host computer system to obtain transaction data from a plurality of point of sale terminals that are associated with a plurality of merchant. The transaction data comprises a merchant identifier for each of the merchants and a transaction amount for each transaction involving the merchants. One of the merchants comprises a promotion merchant that is offering a promotion involving transactions made with the merchant. A portion of the transaction data is aggregated into control merchant aggregated data involving control merchants. The control merchant aggregated data comprises transaction data obtained other than from the promotion merchant. The host computer system calculates a characteristic of the purchases, both for transactions involving the promotion merchant and for the control merchants. An output is produced showing a comparison of the calculation.

In one aspect, the output comprises a report comparing the average dollar value of purchases made at the promotion merchant with the other merchants over a certain time frame. As another option, the output comprises a report comparing the dollar sales volume of purchases made at the promotion merchant with the other merchants over a certain time frame.

In another aspect, each merchant identifier is associated with a classification of goods or services offered by the merchant, and each of the merchants has the same classification of goods. The report shows the classification.

In one option, the output comprises a reporting show a percentage difference in the characteristic of the purchases between the transactions with the promotion merchant and the control merchants. In another aspect, the certain time comprises both before and after the promotion begins, and may be, for example, daily or weekly.

In some cases, an estimated expected sales volume due to the promotion may be provide, and a report may show a comparison of the estimated expected sales volume and an actual sales volume for the promotion merchant.

In one particular aspect, the transaction data from the promotion merchant includes promotional identifiers, and a report is generated showing the average dollar value of purchases made using the promotional identifiers and those made without using the promotional identifiers. In a further option, a report is generated showing the total dollar value of purchases made using the promotional identifiers over a specified time and those made without using the promotional identifiers.

In a further embodiment, the invention provides a system for reporting the effectiveness of a promotion according to point-of-sale (POS) data. The system comprises an aggregation subsystem that is configured to aggregate POS datasets from a plurality of POS terminals, each POS terminal being configured to collect transaction data as a function of transactions effectuated via the POS terminal. The transaction data comprises a merchant identifier for each of the merchants and a transaction amount for each transaction involving the merchants, and one of the merchants comprises a promotion merchant that is offering a promotion involving transactions made with the merchant. The, and the aggregation subsystem is configured to aggregate a portion of the transaction data into control merchant aggregated data involving control merchants, where the control merchant aggregated data comprises transaction data obtained other than from the promotion merchant. A data storage subsystem is communicatively coupled with the aggregation subsystem and is configured to store the aggregated POS data from the plurality of POS terminals. A promotional analysis processing subsystem is communicatively coupled with the POS data store and is configured to calculate a characteristic of the purchases, both for transactions involving the promotion merchant and for the control merchants. A reporting subsystem is communicatively coupled with the promotional analysis processing subsystem and is configured to output graphical report data as a function of the promotional data in response to the reporting request to show a comparison of the calculation, the graphical report data configured to be displayed on a user device.

A variety of reports may be produced, such as a report showing a comparison of the average dollar value of purchases and/or the dollar sales volume of purchases made at the promotion merchant with the other merchants over a certain time frame. In another example, a report shows a percentage difference in the characteristic of the purchases between the transactions with the promotion merchant and the control merchants. This may be for both before and after the promotion begins. As a further example, the reporting subsystem may show a comparison of the estimated expected sales volume and an actual sales volume for the promotion merchant.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

Figure 1:
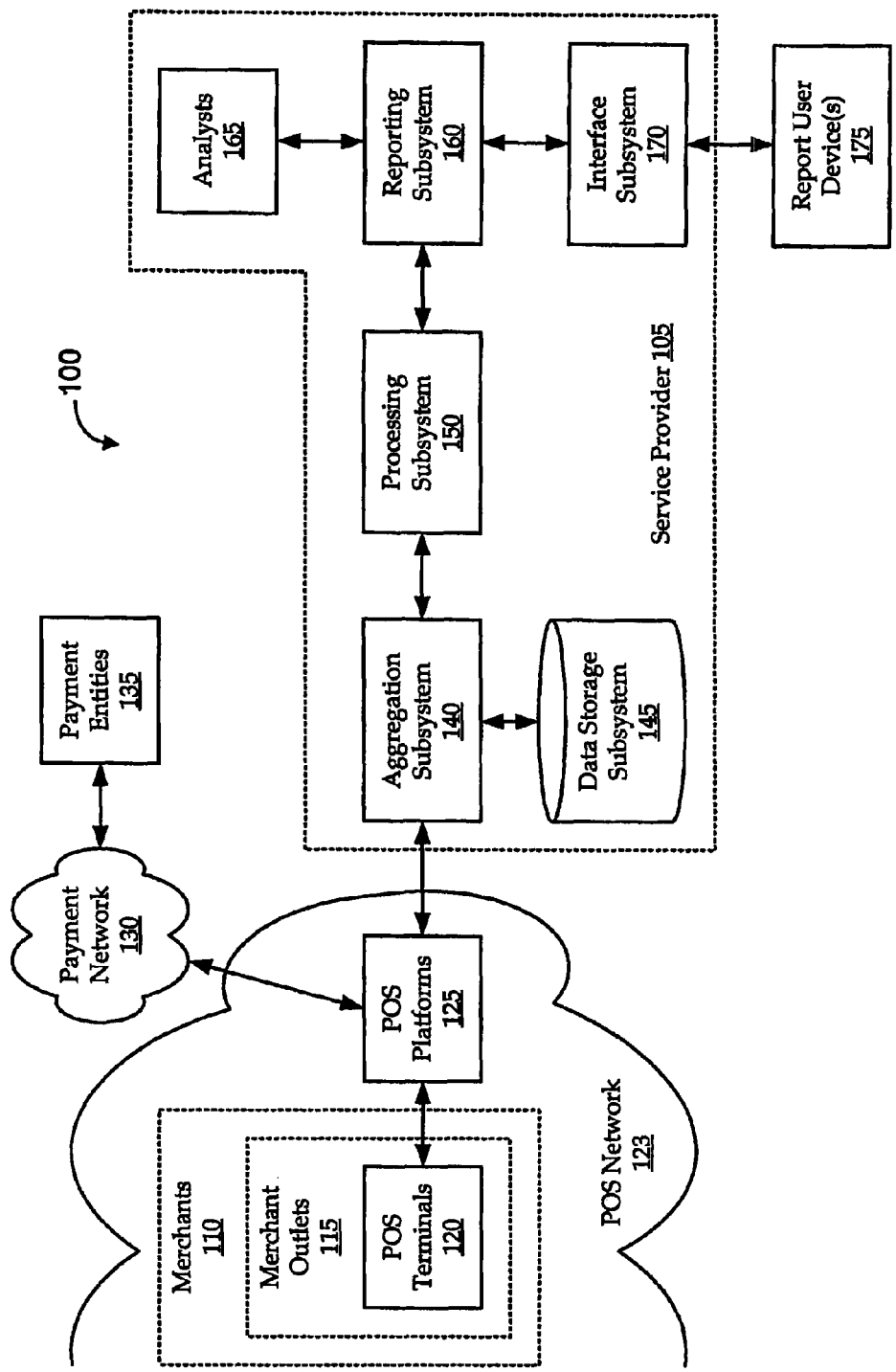
FIG. 1 shows a block diagram of an illustrative transaction network, according to various embodiments.

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Among other things, embodiments described herein utilize actual transaction data aggregated from point-of-sale (POS) terminals to generate and report the effectiveness of promotions. Such POS terminals may be provided in brick and mortar stores, or may constitute any computing device that may connect to a network, such as the Internet. As such a POS terminal may included those used to shop and purchase items on the Internet. As used herein, a promotion may include, but is not limited to, any type of offer where a consumer receives some type of benefit when performing a transaction at a POS, such as a purchase or redemption transaction. The benefit may be received at the time of the POS transaction, or at a later date. A non-limiting example of promotions that may be used with the invention include pre-paid discounts (such as those offered by web-based prepaid offer companies), discounted stored value cards, also known as gift cards, traditional coupons, loyalty programs, and the like. Such promotions may be provided to consumers in a variety of ways, including by traditional print media (periodicals, newspapers, magazines, fliers, coupon books, and the like), by electronic delivery (from a web site, to a mobile phone or other portable computing device, by a text message, or the like), on a transaction instrument, such as a plastic card, an RF or other memory chip, or the like. The promotions will typically include at least one promotional identifier (including loyalty identifiers) so that when the promotion is redeemed at the POS, the redemption may be tracked. The promotional identifier may be unique to each redemption transaction, or may be common over the entire promotion. With the former, tracking of each individual redemption may be tracked, while in the latter, aggregate redemption data may be easier to classify.

By capturing promotional identifiers at the point of sale, this data may be used to determine the effectiveness of a promotional or marketing campaign in a variety of ways. For example, transactional data may be aggregated to produce reports showing average purchases at the time of redemption verses average purchases when not redeeming a promotion. This may be done for transactions that occur with a given merchant, or may be used in a comparison with similarly situation merchants, both for transactions that include promotions and that do not include promotions.

As another example, growth comparisons may be performed to show sales growth for the same promotion offered at different time intervals, such as from August to August. This can be done for a single merchant or across merchants.

In cases where laws permit, tracking may be done on an individual level. In such cases, accounts that were used to purchase a pre-paid promotion may be evaluated to see if those same accounts were used in redeeming the promotion, or to see if the same account is used to make subsequent purchases at the same merchant. Similar comparisons may happen on an aggregate level so that a report could be produced showing the percentage of cardholders that purchased a pre-paid promotion that used their same card in redemption transactions. Other reports could include the ticket amount for each purchase, whether subsequent purchases were made, as well as the number and frequency of any subsequent purchases. For instance, the report could indicate how many times the average consumer who redeemed a promotion returned to the same merchant, and the average amount spent for each visit. Also, reports could be generated to show whether those cardholders chose to make subsequent purchases at similarly situated merchants, rather than with the merchant who originally offered the promotion.

The reports on the effectiveness of a promotion may also be cross correlated with other variables, including, for example, the types of financial accounts used in paying for a pre-paid promotion or in a redemption transaction, the region or geography where the pre-paid promotion was purchased or where a promotion was redeemed, or where subsequent purchases were made. Reports may also show the timing of purchases of pre-paid promotions, the timing of redemptions, or the timing when subsequent purchases were made. These comparisons could be intra-day or over longer time periods. For instance, reports could show whether a promotion was effective in having consumers redeem transactions at certain times of the day, thus modifying their normally scheduled visits to the merchant.

Turning first to FIG. 1, a block diagram of an illustrative transaction network 100 is shown, according to various embodiments. As illustrated, a service provider 105 is in communication with a number of POS terminals 120 that are in further communication with a payment network 130. Transactions are effectuated via the POS terminals 120 (e.g., using payment cards and/or other known forms of payment). POS terminals 120 are also used to receive promotional identifiers that are tied to certain promotions. In some embodiments, payment entities 135 interact with the payment network 130, for example, to perform various authorization and/or other functions relating to the transactions. Data from the transactions may be aggregated by the service provider 105 for use in generating report data on the effectiveness of a promotion. In some embodiments, one or more report user devices 175 are in communication with the service provider 105, for example, to exploit the generated promotional report data.

Use of POS terminals 120 in effectuating transactions is well known in the art. As such, and for the sake of clarity, specific operations of POS terminals 120, POS networks 123, payment networks 130, payment entities 135, etc. will not be fully described herein. Rather, these and related terms and phrases should be broadly construed to include any transaction facilitating devices, systems, and techniques that are useable in the context of the various embodiments described herein.

For example, as used herein, POS terminals 120 may include cash registers, and any other alternative and/or peripheral devices or systems, including hardware and/or software, for effectuating transactions between a merchant and a consumer. POS platforms 125, as used herein, include any hardware and/or software for facilitating communications between one or more POS terminals 120 and the payment network 130 and/or service provider 105. In one embodiment, the POS platforms 125 include proprietary platforms, such as merchant platforms offered by First Data Corporation. In some embodiments, one or more interfaces are included with the POS terminals 120 and/or the POS platforms 125 to facilitate use by end consumers (e.g., cardholders, payors, etc.), salespersons, etc. The POS network 123, as used herein, is intended to broadly include any type of physical or virtual network, including one or more communications networks, corporate networks, etc. For example, a large number of globally distributed POS terminals 120 may, in some embodiments, be considered as part of a global POS network 123, even where some or all of the POS terminals 120 in the POS network 123 may not be in communication with one another.

As used herein, "POS terminals" are intended to include both physical terminals located at brick and mortar locations as well as virtual terminals (some type of computer system) capable of receiving and processing transaction requests. For example, financial transactions occurring other than at brick and mortar locations can include Internet transactions (typically involving a merchant web site or other payment portal, such as PayPal), mobile transactions made using a mobile device or phone, and the like. For these transactions, payment information is transmitted over some type of network to a computer system that is capable of receiving such transactions and then processing them to complete the financial transaction. It will be appreciated, however, that some transactions using mobile devices (such as mobile phones, iPads, and the like) can be made by directly or indirectly interfacing with POS terminals located in brick and mortar locations as well.

The POS terminals located at brick and mortar locations can capture transaction data in a number of ways, including by the use of payment cards with magnetic stripes, smart chips, RF transponders (RFID chips) or the like. The POS terminals can also read transaction information from non-traditional "cards", such as when reading information from checks or other negotiable instruments, such as by reading MICR lines, by the use of OCR scanners, by manually keying in data, or the like. Also, the POS terminals can read information associated with promotions, including promotional identifiers read from discount instruments, such a coupons, loyalty cards, and the like. In addition to reading this information, the POS terminals may have such promotional identifiers directly keyed in using an entry device. Further, various communication channels can be used to transmit data from the payment vehicle to the POS terminal, such as by Bluetooth, cellular, RF, and the like. These configurations permit payments to be made using a variety of payment vehicles, including by credit cards, debit cards, checks or other negotiable instruments, ACH transaction, prepaid cards or accounts, stored value cards or accounts, and the like. In each of these, the appropriate information will be captured from the transaction at the POS terminal so that reports may be produced as described herein.

Hence, when receiving the transaction data, the POS terminals capture data pertinent to conducting a transaction, such as the amount of the transaction, the payment instrument or vehicle, the time of the transaction, the promotional identifier, and the like. The POS terminals also provide information on the location of the POS device (or location of the merchant—by physical address, web site or the like) as described hereinafter.

As illustrated, some or all of the POS terminals 120 may be located at (e.g., inside, on the property of, in close proximity to, etc.) a merchant outlet 115. The merchant outlet 115 may be the only one, or one of many, locations of a particular merchant 110. For example, each merchant outlet 115 may be a physical store location, a franchise location, a branch office, virtual presence, etc. of a merchant 110. Of course, where the merchant 110 has only a single presence, the merchant outlet 115 and the respective merchant 110 may be one and the same.

Embodiments of the POS terminals 120 are configured to be associated with certain types of information and to collect certain types of information. For example, each POS terminal 120 may collect and/or be associated with terminal information and transaction information, as described more fully below. The transaction and terminal information may be sent to the POS platforms 125 for various types of processing. For example, some or all of the information may be sent to the payment network 130 for authorization by one or more payment entities 135 (e.g., issuing banks, payment card companies, etc.), and/or the information may be sent to the service provider 105.

Functions of the service provider 105 may be carried out by one or more subsystems. In various embodiments, components of the subsystems are implemented, in whole or in part, in hardware. Thus, they may include one or more Application Specific Integrated Circuits (ASICs) adapted to perform a subset of the applicable functions in hardware. Alternatively, the functions may be performed by one or more other processing units (or cores), on one or more integrated circuits (ICs). In other embodiments, other types of integrated circuits may be used (e.g., Structured/Platform ASICs, Field Programmable Gate Arrays (FPGAs), and other Semi-Custom ICs), which may be programmed. Each may also be implemented, in whole or in part, with instructions embodied in a computer-readable medium, formatted to be executed by one or more general or application specific controllers.

In some embodiments, data from all the POS terminals 120 is received and aggregated by an aggregation subsystem 140. The aggregation subsystem 140 generates and stores aggregated POS datasets in a data storage subsystem 145. Embodiments of the data storage subsystem 145 may include any useful type of data storage. For example, the data storage subsystem 145 may include servers, hard disks, etc. Further, the aggregated data may be stored using any useful types of security, data structure, etc. In one embodiment, the aggregated data is stored as an associative database to facilitate various types of data processing functions (e.g., mining, filtering, sorting, etc.).

In some embodiments, as described more fully below, the aggregated data may be processed by a processing subsystem 150. Embodiments of the processing subsystem 150 are configured to generate various types of market trend and/or other data for use by a reporting subsystem 160. Embodiments of the reporting system 160 use the data generated by the processing subsystem 150 to generate one or more types of market reports, including the effectiveness of a given promotion. In some embodiments, additional information is used to generate reports, including data received from one or more analysts 165 and/or other data sources.

The service provider 105 may further include an interface subsystem 170 to facilitate interaction with and/or delivery of reporting data generated by the reporting system. In some embodiments, one or more report user devices 175 interface with the service provider via the interface subsystem 170. For example, the report user devices 175 may request certain reports, receive report data for viewing, etc.

Figure 2:
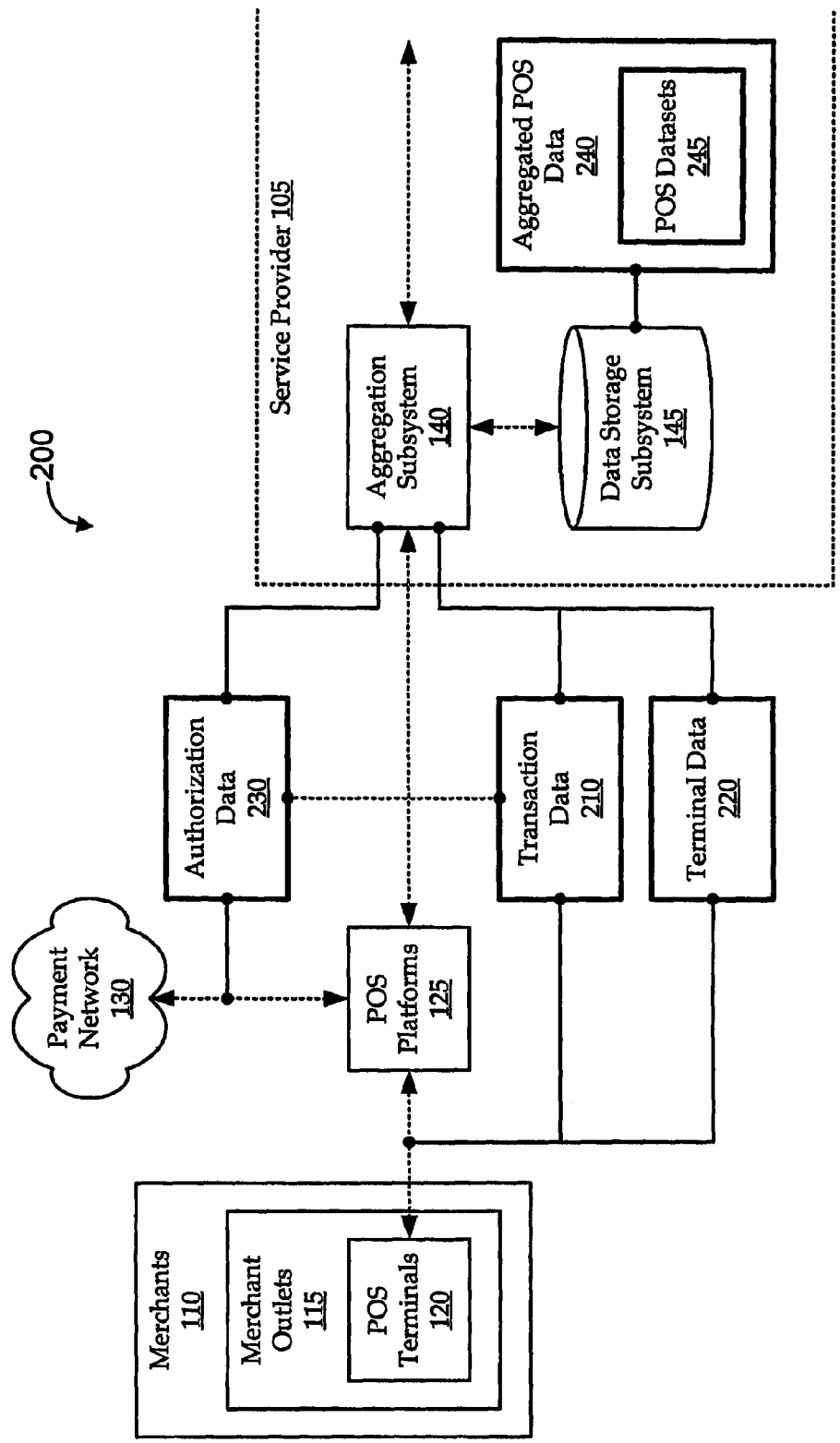
FIG. 2 shows a data flow diagram in the context of a first portion of a transaction network, according to various embodiments.
Figure 3:
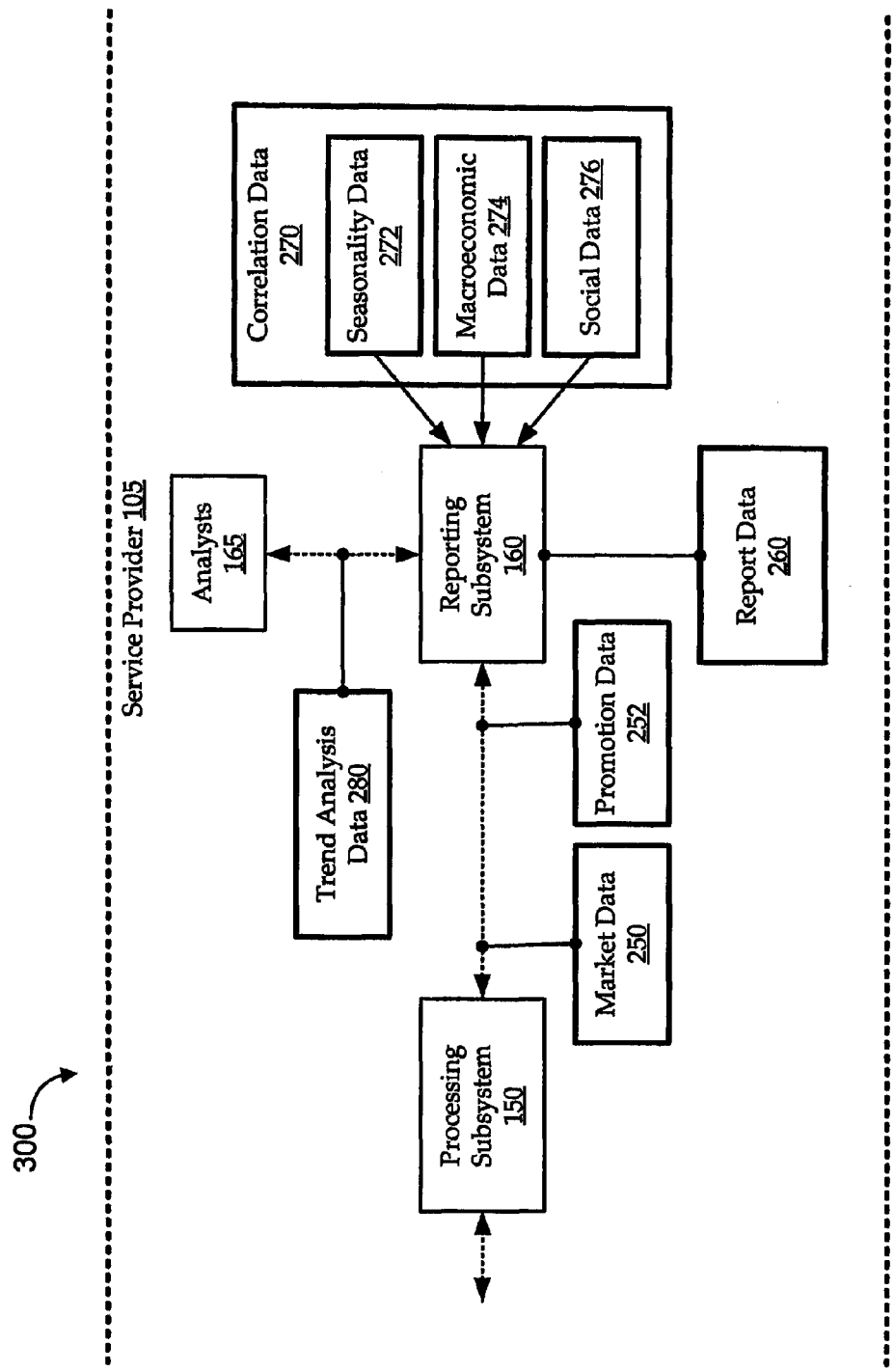
FIG. 3 shows a data flow diagram in the context of a second portion of a transaction network, according to various embodiments.
Figure 4:
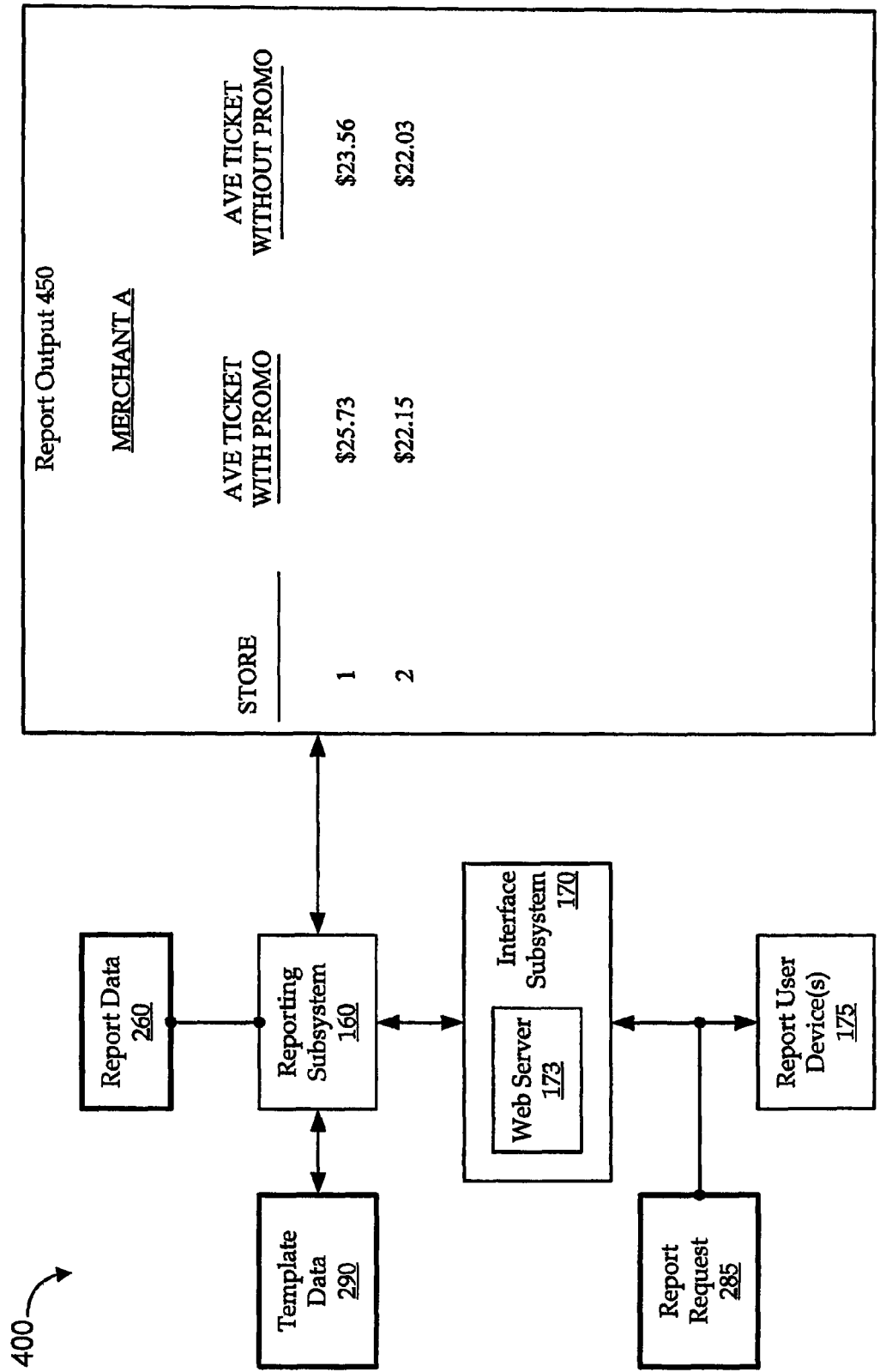
FIG. 4 shows a data flow diagram in the context of a third portion of a transaction network, according to various embodiments.

The functionality of various components of the market network 100, including the various subsystems of the service provider 105, will be described more fully below. For example, FIGS. 2-4 illustrate some embodiments of data flow through transactional networks, like the network 100 of FIG. 1, each focusing on a portion of the data flow for the sake of clarity. Turning first to FIG. 2, a data flow diagram 200 is shown in the context of a first portion of a network, according to various embodiments.

Embodiments of the data flow diagram 200 focus on generation and aggregation of POS data. As in a portion of the market network 100 of FIG. 1, a service provider 105 is in communication with a number of POS terminals 120 that are in further communication with a payment network 130. Embodiments of the POS terminals 120 are disposed at (e.g., located in or near) merchants 110 or merchant outlets 115. Transactions are effectuated via the POS terminals 120. Data from the transactions may be aggregated by an aggregation subsystem 140 of the service provider 105, which may be stored in a data storage subsystem 145.

Embodiments of the POS terminals 120 are configured to be associated with certain types of information and to collect certain types of information. While each POS terminal 120 may collect and/or be associated with many different types of information, some typical types of information can be classified into two general categories: transaction data 210 and terminal data 220. The terminal data 220 may include information relating to (e.g., identifiers corresponding to) the merchant 110 and/or particular merchant outlet 115 where the POS terminal 120 is located, network information (e.g., Internet protocol (IP) address, security protocols, etc.), configuration information (e.g., types of payment instruments accepted, software version, etc.), and/or any other information relating to the POS terminal 120 and not specifically to any transaction effectuated via the POS terminal 120.

It is worth noting that the terminal data 220 may indicate various characteristics of the POS terminals 120 in various ways. For example, various types of merchant classifiers may be used. In one embodiment, a merchant classifier code (MCC) defined by a government standard is used to identify each merchant. In other embodiments, a proprietary code may be used. Further, in some embodiments, each merchant is identified by a single classifier, even where the merchant operates in multiple markets. For example, a megastore may sell groceries, general merchandise, gasoline, insurance services, etc., but the merchant may be classified only using a "grocery" classification. In an alternate embodiment, the megastore may be classified using multiple classifiers. In still another embodiment, the megastore may be classified by both a single classifier (e.g., a default classifier, or a classifier chosen to comply with a particular standard) and by one or more other classifiers (e.g., according to proprietary classification systems).

The transaction data 210, on the contrary, may include any type of information relating to one or more transactions effectuated via the POS terminal 120. For example, the transaction data 210 may include timestamp information (e.g., a date and time, or time range, of one or more transactions), transaction value, fee and/or discount information, product category and/or description information, demographic information (e.g., relating to the payor), etc.

The transaction data 210 that is collected by POS terminal 120 may depend on the particular payment instrument used to effectuate a payment. For example, when paying by credit or debit card, the track two data is typically read using a magnetic stripe reader. Also, the amount of the purchase is entered, typically electronically from a cash register. For Internet transactions, the amount may be generated from the merchant's web site or a payment processing company. For negotiable instruments, the MICR line is typically read using the POS terminal 120. Other information, such as the amount of the check, may also be entered, either by manually keying in the information, electronically by the cash register, from a web site or the like. For closed-loop prepared cards, such as traditional magnetic strip gift cards, the account number is typically read from the magnetic stripe and the amount of the transaction is received by manual key in, from a cash register, from a web site or the like. Transactions from mobile devices or from the Internet typically include data similar to traditional payment forms, as such transactions usually stem from electronic wallets that typically include information similar to their physical counterparts. However, these transactions also include data indicating that the transaction originated from a mobile device or the internet and can be used in generating market reports.

Additional transaction data 210 may include data collected by POS terminal 120 that relates to a promotion that is being redeemed at the POS terminal 120, often referred to as a redemption transaction. Examples of promotion data includes promotional identifiers that are used to identify the terms and conditions of a given promotion. Non-limiting examples of promotional identifiers include coupon codes, often stored as a bar code on a coupon, that provide a certain amount off the purchase of one or more items, free items with the purchase of one or more other items, etc., numbers or identifiers associated with pre-paid discounts where, for example, a consumer may pay $50 and use the pre-paid discount for up to $100 on the purchase, loyalty identifiers where prices of certain items are discounted automatically at the POS or discounts or cash back is provided to the consumer at a later date, and the like. Such promotional identifiers may be stored then entered into POS terminal 120 using techniques similar to those associated with any of the other transaction data described herein.

Not all the transaction data received at the POS terminal 120 may be needed in order to generate the reports. As such, a parsing processes may be used to extract only the relevant data needed to produce the reports. This parsing can occur at various locations, including but not limited to the POS platforms 125, the service provider 105, aggregation subsystems, or the like.

The transaction data 210 and terminal data 220 may be sent to the POS platforms 125 for various types of processing. In certain embodiments, some or all of the transaction data 210 may be sent from the POS platforms 125 to the payment network 130 for authorization. For example, transactions may be authorized, denied, canceled, etc. In some embodiments, the authorization process generates authorization data 230 that may or may not be included in the transaction data 210. In some embodiments, the transaction data 210, terminal data 220, and/or authorization data 230 are sent from the POS platforms 125 to the service provider 105. In various embodiments, information may be communicated to the service provider 105 periodically (e.g., every night), as a result of a trigger event (e.g., after a particular magnitude change in an economic indicator or social event), on demand (e.g., on request by the service provider 105), etc.

In some embodiments, the various types of data are sent to the aggregation subsystem 140 using standard formats and/or protocols. In other embodiments, the aggregation subsystem 140 is configured to process (e.g., parse) the data into a usable and/or desired format. The data may then be stored in the data storage subsystem 145 as aggregated POS data 240. In some embodiments, the aggregated POS data 240 is a collection of POS datasets 245. It is worth noting that the aggregated POS data 240 may be arranged in any useful way, for example, as an associative database, as a flat file, as sets of POS datasets 245, in encrypted or unencrypted form, in compressed or uncompressed form, etc.

Embodiments may then use the aggregated POS data 240 to generate various types of data, including data on the effectiveness of promotions, market trend data, and the like. FIG. 3 shows a data flow diagram 300 in the context of a second portion of a transaction network, according to various embodiments. In some embodiments, the context of FIG. 3 includes various subsystems of the service provider 105. For example, as illustrated in the data flow diagram 200 of FIG. 2, aggregated POS data 240 may be generated by the aggregation subsystem 140 and stored in the data storage subsystem 145. This aggregated POS data 240 may then be used by other subsystems of the service provider 105 for further processing.

In some embodiments, the processing subsystem 150 uses the aggregated POS data 240 (e.g., either directly from the data storage subsystem 145 or via the aggregation subsystem 140) to generate market data 250 as described generally in copending U.S. application Ser. No. 13/032,878, filed Feb. 23, 2011 and Ser. No. 12/758,397, filed Apr. 12, 2010, previously incorporated by reference. For example, the aggregated POS data 240 may include merchant type flags, merchant identifiers, merchant outlet identifiers, transaction amounts, numbers of transactions, payment types used, transaction types (e.g., sale, cash advance, return, etc.), transaction authorizations (e.g., authorize, decline, etc.), timestamps, etc. As used herein, the market data 250 may include any types of data useful in generating market analyses and/or reports that can be extracted and/or derived from the aggregated POS data 240.

In some embodiments, processing subsystem 150 also uses the aggregated POS data 240 to generate promotion data 252 that is used to indicate the effectiveness of a promotion. For instance, the promotion data 252 may include promotional identifiers that are used to identify the terms and conditions of a given promotion as well as any of the market data just described. Also, in some cases, like where a pre-paid discount instrument was used in making a redemption, promotion data 252 may also include information on the purchase of the pre-paid discount, including, for example, payment type used for the purchase, time of the purchase, location of the purchase, as well as the demographics on the purchaser, preferably only when the purchaser has opted in to providing such personal information so as to comply with current privacy protection laws.

In some cases, a type of mapping may be used in order to be useful for a given market, such as trends by industry, geography, card type and the like. This mapping may be overlaid with the promotion data so that the effectiveness of a promotion may be determined across different categories, such as by industry, geography, card type, time of day, and the like. For instance, data from the POS terminal may reveal the identify of a given merchant. This merchant may then be classified into a specific industry, such as fast food, so that a report may be produced showing the effectiveness of a promotion by industry. A similar approach can be used when determining the effectiveness of a promotion by region or geography, such as by knowing the zip code of the merchant or other geographic identifier originally gleaned from the POS terminal. For card types, the transaction data can be evaluate to determine what payment instrument was used in the transaction. For time of day, reports can be generated to show whether a promotion was effective in shifting patterns of purchase from one time of day to another, such as whether a coupon for an earlier movie showing is effective in filling a theatre earlier in the day as compared to in the evening. As described above, not all data collected at the POS terminals need be used to generate the reports. This may be done for both POS terminals located in physical stores as well as virtual POS terminals used with e-commerce and mobile transactions.

Given these and/or other types of aggregated POS data 240, the market data 250 and promotion data 252 may include extracted or classified data, such as data extracted for a particular time period, data extracted for all records having the same store identifier, data classified by merchant type, data classified by location (e.g., merchant region, geographic region, etc.), data classified by dollar volume, data classified by average ticket price, etc. The market data 250 and/or promotion data 252 may additionally or alternately include trend data, such as data trends over a particular time period or compared to a baseline. The trends may look at time periods, payment types, merchants, merchant categories, geography, transaction volumes, ticket values, or any other useful (e.g., and derivable) characteristics of the aggregated POS data 240.

In some embodiments, the market data 250 and/or promotion data 252 is used by a reporting subsystem 160 of the service provider 105. Embodiments of the reporting subsystem 160 use the market data 250 and/or promotion data 252 to generate report data 260. The report data 260 may typically include data desired for generation of a market report and/or promotion effectiveness report, which may, for example, include data to support graphical representations of trends (e.g., for generation of bar graphs, pie charts, line graphs, spreadsheets, etc.), indications of events (e.g., for highlighting data, circling data, flagging data, etc.), etc.

While certain embodiments of the reporting subsystem 160 generate reporting data 260 only according to market data 250 and/or promotion data 252, other embodiments may use additional data. In some embodiments, the reporting subsystem 160 is configured to interface with one or more analysts 165 (e.g., human or machine). The analysts 165 may generate trend analysis data 280. For example, the trend analysis data 280 may include explanations, headlines, annotations, etc., for example, for adding value to an end user of the report data 260.

In some embodiments, the reporting subsystem 160 is in communication with one or more sources of correlation data 270. The correlation data 270 may include any type of data that could be useful in identifying correlations with and/or explanations of the market data 250 and/or promotion data 252. For example, embodiments of the correlation data 270 include seasonality data 272, macroeconomic data 274, and/or social data 276.

Embodiments of the seasonality data 272 may include information relating to time of year, number of workdays, number of weekends in a month, season, holidays, etc. For example, January revenue may correlate at least in part to the number of weekends in January each year. Embodiments of macroeconomic data 274 may include information relating to gross domestic product, personal bankruptcy, unemployment, total consumer debt, etc. For example, an increase in unemployment in a geographic region may correlate to an increase in fast food sales for that region. It is worth noting that the term "macroeconomic" is used herein only to distinguish from economic transaction data for a particular POS terminal 120. It will be appreciated that certain data, which may technically be classified as "microeconomic" in nature may be included in the macroeconomic data 274, such as economic trends relating to a particular subset of consumers, to particular externalities or market failures, to a particular merchant outlet or branch office, etc. Embodiments of social data 276 may include information relating to particular social trends, fads, military incursions, regulatory issues, political issues, etc. For example, a beef scare relating to a grocery store in a particular week may correlate to a drop in revenue for that grocery merchant for that week.

It will be appreciated that many other types of correlation data 270 are possible and may be received and/or derived from many types of sources. The correlation data 270 may also be collected periodically, based on historical data that was gathered or generated previously, etc. It will be further appreciated that the correlation data may be used by the analysts 165 in generating trend analysis data 280. For example, an analyst 165 may identify a correlation between the market data 250 and certain correlation data 270. The analyst 165 may then write up an explanation of the correlation, identify the correlation, do more research, etc. Other types and uses of correlation data 270, trend analysis data 280, and/or other data is described more fully below.

The report data 260 generated by the reporting subsystem 160 may be used in a number of different ways. Some of these ways are described in copending U.S. application Ser. No. 13/032,878, filed Feb. 23, 2011 and Ser. No. 12/758,397, filed Apr. 12, 2010, previously incorporated by reference. Others are shown with reference to FIG. 4. FIG. 4 shows a data flow diagram 400 in the context of a third portion of a transaction network, according to various embodiments. In some embodiments, the reporting subsystem 160 generates the report data 260 according to embodiments described with reference to FIG. 3. The report data 260 may then be used to generate one or more types of reports.

In some embodiments, the reporting subsystem 160 is in communication with an interface subsystem 170. Embodiments of the interface subsystem 170 are configured to provide an interface between the reporting subsystem 160 (and/or other subsystems of the service provider 105) and one or more consumers of the report data 260. For example, one or more end consumers may interact with the interface subsystem 170 via one or more report user devices 175. In various embodiments, the report user devices 175 may include any type of device capable of providing the desired report data 260 to the end consumer. For example, the report user devices 175 may include desktop and laptop computers, smart phones, personal digital assistants, e-readers, etc.

In some embodiments, the report user devices 175 interact with the interface subsystem 170 over a network (e.g., the Internet). These interactions may be facilitated in certain embodiments by a web server 173 in the interface subsystem 170. Some embodiments of the interface subsystem 170 may further include interface elements for various functions, such as authorization (e.g., login elements, encryption elements, etc.), graphical user interface handling, query handling, etc.

Embodiments of the interface subsystem 170 are used to facilitate provision of a report output 450 (e.g., a graphical report product) to one or more report user devices 175. In certain embodiments, the report user devices 175 can provide report requests 285 to the reporting subsystem 160 via the interface subsystem 170. For example, the report requests 285 may include one or more queries and/or other information for generating a report from the report data 260. Alternately, the report requests 285 may be issued after a report output 450 has already been generated, for example, to filter, refine, update, reformat, or otherwise affect the report output 450. In certain embodiments, report outputs 400 are generated without allowing for any report requests 285 before or after the report generation. Further, in some embodiments, report outputs 400 are generated according to automatically generated report requests 285. For example, a subscriber of a reporting service may have certain preferences (e.g., selected preferences, preferences based on the subscriber's portfolio, etc.), which may be used to decide what information is presented in a report output 450 and/or in what form.

In some embodiments, the report output 450 is also affected by template data 290. Depending on the type of output, the template data 290 may include any useful formatting or presentation information. For example, the template data 290 may include a style sheet, font information, margin information, graphics, etc. In certain embodiments, the template data 290 defines certain zones on all or part of the report output 450. Each zone may be dependent on other zones or independent, it may be automatically filled with report data or left open for manual input, or used in any other useful way.

In the illustrated embodiment of FIG. 4, the report output 450 includes same store average ticket price for transactions where a promotion was redeemed and where no promotion was redeemed. Although shown with average ticket for same store with and without a promotion, other reports may be generated. Merely by way of example, the average ticket could be shown in comparison with similarly situation merchants, both for transactions that include promotions and that do not include promotions. As another example, growth comparisons may shown illustrating sales growth for the same promotion offered at different time intervals. As a further example, a report could show the percentage of cardholders that purchased a pre-paid promotion that used their same card in redemption transactions. Other reports could include the ticket amount for each purchase, whether subsequent purchases were made, as well as the number and frequency of any subsequent purchases. For instance, the report could indicate how many times the average consumer who redeemed a promotion returned to the same merchant, and the average amount spent for each visit. Also, reports could be generated to show whether those cardholders chose to make subsequent purchases at similarly situated merchants, rather than the merchant who originally offered the promotion. Any of the reports could include other variables, including, for example, the types of financial accounts used in paying for a pre-paid promotion or in a redemption transaction, the region or geography where the pre-paid promotion was purchased or where a promotion was redeemed, or where subsequent purchases were made. Reports may also show the timing of purchases of pre-paid promotions or the timing of redemptions, or the timing when subsequent purchases were made. These comparisons could be intra-day or over longer time periods.

As mentioned, data in various embodiments may be focused on same store performance. As used herein, "same store" data generally refers to data aggregated from either an identical set of POS terminals 120 or from a statistically insignificant change in a sample set. For example, as discussed above, the market data 250 and/or promotion data 252 is derived using actual data from actual transactions effectuated via actual POS terminals 120. As such, real-world changes in the number of POS terminals 120 may have a noticeable effect on generated data if not properly accounted for.

Suppose, for example, that thirty new merchant outlets 115 open for a particular merchant 110 over a single year, and each merchant outlet 115 has an average of four POS terminals 120. The aggregated POS data 240 may show a large increase in dollar volume over that time period. For certain market reports, that information may be useful. For example, certain investors may be interested in the overall growth of that particular merchant's 110 dollar volume over the timeframe. For other market reports, however, it may be desirable to have an "apples-to-apples" comparison from one timeframe to another. For example, the overall growth may provide little or no information about representative growth of particular stores, of particular markets, etc.

As such, it may be desirable to generate reports based on a "same store" analysis. For example, it may be desirable to generate market data for substantially the same store sample set over two different timeframes. Notably, this and/or other functionality may include removal of irrelevant and/or unreliable data (e.g., or identification of relevant and/or reliable data. As such, certain embodiments generate a reliable portion of the market data 250 for use in generating the report data 260.

In one embodiment, when the aggregated POS data 240 shows insufficient data over the timeframe of interest (e.g., a particular POS terminal 120 has only been collecting transaction data 210 for a portion of the timeframe), the data may be removed from the analytical dataset. In another embodiment, statistical analyses may be performed to determine whether to use certain data. For example, market data 250 may be generated with and without certain data, and the differences may be analyzed to determine whether they are significant. Where the differences are significant, the data may be discarded and/or further analysis may be performed to determine why the difference is significant (e.g., and whether that significant difference would be worth reporting as part of the report data 260).

While not indicated, other reporting and display techniques may be used to enhance the look, feel, usefulness, etc. of the report output 450. In one embodiment, the report output 450 is configured to be displayed through a web browser or similar interface using a report user device 175. A user may interact with the report output 450 using menus, buttons, links, and/or other navigation elements. The navigation may allow the user, for example, to jump between sections of the report output 450, to show or hide elements (e.g., the second explanation zone 406b), to dynamically process (e.g., filter, sort, etc.) charted data, to reformat the page layout, etc.

Figure 5:
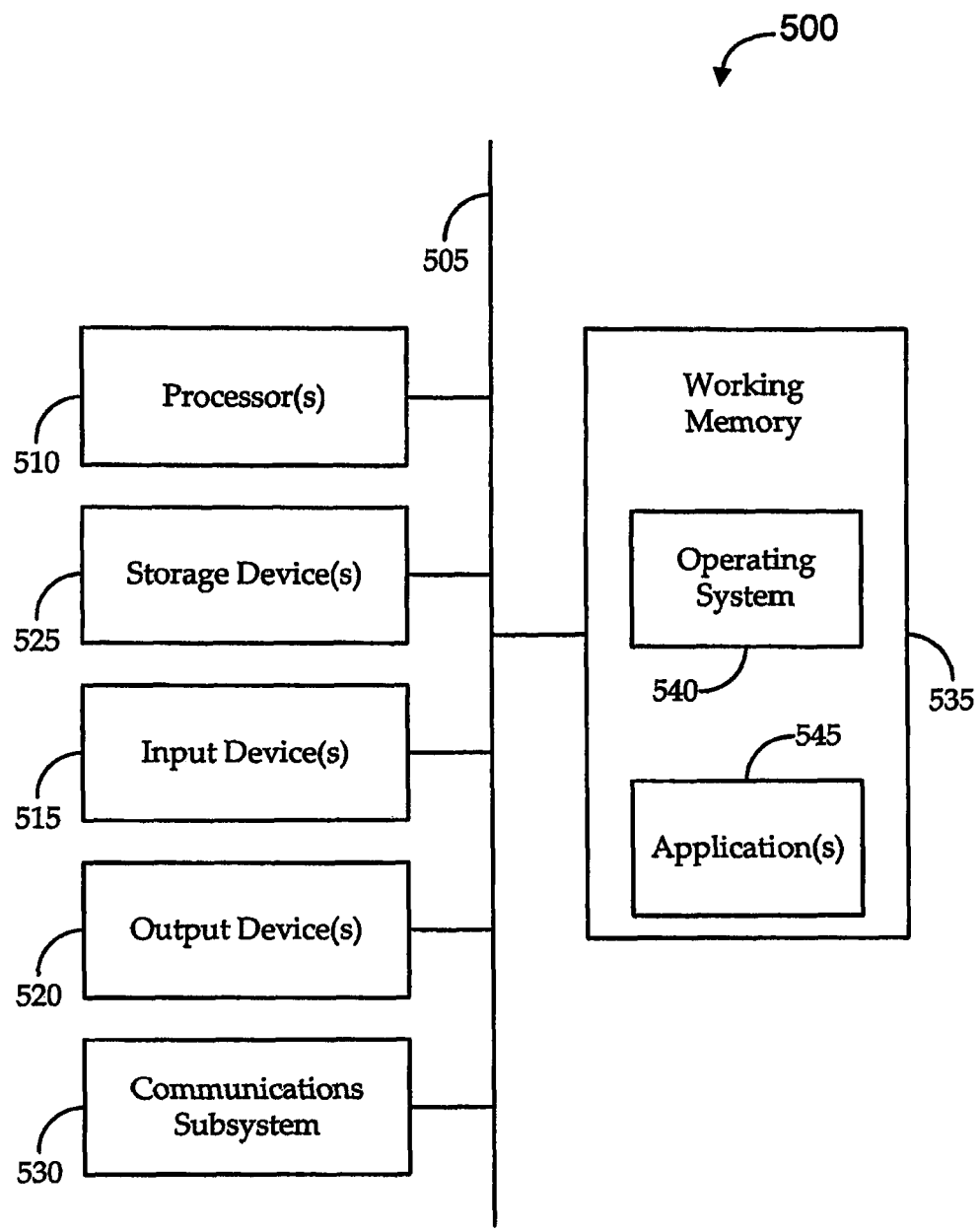
FIG. 5 shows an illustrative computational system for performing functionality to facilitate implementation of embodiments described herein.

As discussed above, the various subsystems of the service provider 105 may be implemented in hardware and/or software. In some embodiments, one or more computational systems are used, having instructions stored in memory that can be executed to cause processors and/or other components to perform certain methods (e.g., by implementing functionality of one or more of the subsystems). FIG. 5 shows an illustrative computational system 500 for performing functionality to facilitate implementation of embodiments described herein. For example, components of the computational system 500 may be used to implement functionality of one or more subsystems of the service provider 105. It should be noted that FIG. 4 is meant only to provide a generalized illustration of various components, any or all of which may be utilized as appropriate. FIG. 5, therefore, broadly illustrates how individual system elements may be implemented in a relatively separated or relatively more integrated manner.

The computational system 500 is shown to include hardware elements that can be electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515, which can include without limitation a mouse, a keyboard and/or the like; and one or more output devices 520, which can include without limitation a display device, a printer and/or the like.

The computational system 500 may further include (and/or be in communication with) one or more storage devices 525, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 500 might also include a communications subsystem 530, which can include without limitation a modem, a network card (wireless or wired), an infrared communication device, a wireless communication device and/or chipset (such as a Bluetooth device, an 802.11 device, a WiFi device, a WiMax device, cellular communication facilities, etc.), and/or the like. The communications subsystem 530 may permit data to be exchanged with a network (such as the network described below, to name one example), and/or any other devices described herein. In many embodiments, the computational system 500 will further include a working memory 535, which can include a RAM or ROM device, as described above.

The computational system 500 also can include software elements, shown as being currently located within the working memory 535, including an operating system 540 and/or other code, such as one or more application programs 545, which may include computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 525 described above.

In some cases, the storage medium might be incorporated within the computational system 500 or in communication with the computational system 500. In other embodiments, the storage medium might be separate from a computational system 500 (e.g., a removable medium, such as a compact disc, etc.), and/or provided in an installation package, such that the storage medium can be used to program a general purpose computer with the instructions/code stored thereon. These instructions might take the form of executable code, which is executable by the computational system 500 and/or might take the form of source and/or installable code, which, upon compilation and/or installation on the computational system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs the computational system 500 to perform methods of the invention. According to a set of embodiments, some or all of the procedures of such methods are performed by the computational system 500 in response to processor 510 executing one or more sequences of one or more instructions (which might be incorporated into the operating system 540 and/or other code, such as an application program 545) contained in the working memory 535. Such instructions may be read into the working memory 535 from another machine-readable medium, such as one or more of the storage device(s) 525. Merely by way of example, execution of the sequences of instructions contained in the working memory 535 might cause the processor(s) 510 to perform one or more procedures of the methods described herein.

The terms "machine-readable medium" and "computer readable medium", as used herein, refer to any medium that participates in providing data that causes a machine to operate in a specific fashion. In an embodiment implemented using the computational system 500, various machine-readable media might be involved in providing instructions/code to processor(s) 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 525. Volatile media includes, without limitation, dynamic memory, such as the working memory 535. Transmission media includes coaxial cables, copper wire and fiber optics, including the wires that comprise the bus 505, as well as the various components of the communication subsystem 530 (and/or the media by which the communications subsystem 530 provides communication with other devices).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computational system 500. The communications subsystem 530 (and/or components thereof) generally will receive the signals, and the bus 505 then might carry the signals (and/or the data, instructions, etc., carried by the signals) to the working memory 535, from which the processor(s) 505 retrieves and executes the instructions. The instructions received by the working memory 535 may optionally be stored on a storage device 525 either before or after execution by the processor(s) 510.

It will be appreciated that the systems described with reference to FIGS. 1-5, including the computational system 500 of FIG. 5, may be used to implement a number of methods. Some of these methods are discussed with reference to FIGS. 6-19. For the sake of clarity, embodiments of the methods may be discussed with reference to the illustrative system components of FIGS. 1-5. It will be appreciated that these descriptions should not be construed as limiting the scope of the methods or of the components described with reference to the methods.

Figure 6:
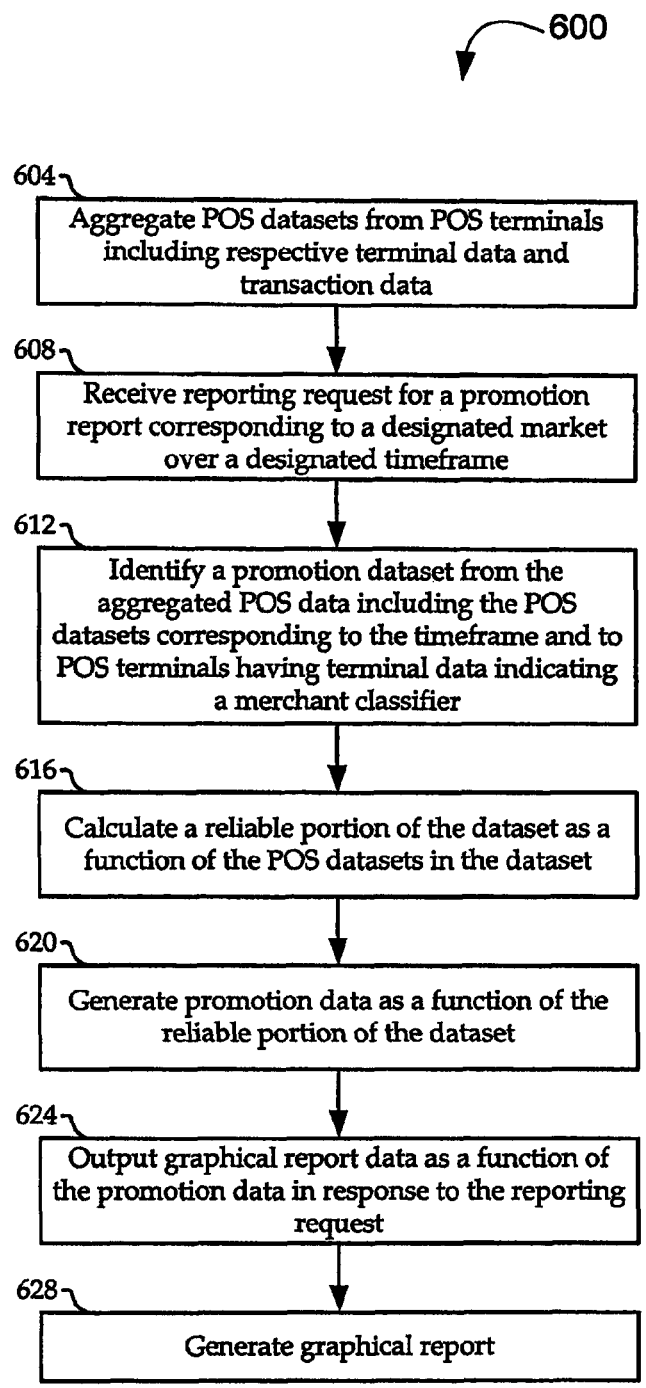
FIG. 6 shows a flow diagram illustrating a method for generating a graphical report, according to various embodiments.

FIG. 6 shows a flow diagram illustrating a method 600 for generating a promotion report, according to various embodiments. The method 600 begins at block 604 by aggregating POS datasets from POS terminals. For example, the aggregation subsystem 140 of the service provider 105 may be used to generate aggregated POS data 240 from a number of POS terminals 120. The aggregated POS data 240 may include transaction data 210, terminal data 220, and/or authorization data 230.

In some embodiments, at block 608, a request is received for a promotion report. The requested report may correspond to a designated timeframe, a designated market, and/or any other designations. In various embodiments, the request may originate from a user using a report user device 175 via an interface subsystem 170, via a computer-generated request for updating a website or generating a periodic mailing, etc.

At block 612, a promotion dataset may be identified or generated from the aggregated POS data 240, for example, according to the request received in block 608. In some embodiments, market data 250 is generated from the aggregated POS data 240 including the POS datasets 245 corresponding to the designated timeframe(s) and to POS terminals 120 having terminal data 220 indicating a merchant classifier corresponding to the designated market(s).

As discussed above, it may be desirable to use only a reliable portion of the market dataset identified or generated in block 612. For example, POS datasets 245 from POS terminals 120 having transaction data 210 for only a portion of the timeframe may be ignored or treated differently (e.g., displayed with special indications and not used in calculating certain trends). At block 616, a reliable portion of the dataset may be calculated as a function of the POS datasets in the dataset. For example, only same store data, only data having a statistically insignificant variability from a baseline, etc. may be included in the reliable portion.

At block 620, promotion data may be generated as a function of the reliable portion of the market dataset. At step 624, a graphical report is output showing the promotion report, and in step 628 a graphical report is generated.

The various reports may be provided in a variety of ways. For example, the systems herein may be employed to physically print the reports and mail them to customers. Alternatively, the reports may be electronic in form and electronically transmitted to a client, such as by email. Another option is to provide a customer with the ability to log on to a website and then allow the customer to view the reports online. In some cases, options may be provided to permit the customer to tailor the reports by varying certain criteria.

The various reports that are electronically accessible via the Internet or similar portal may be produced using any of the systems or subsystems described herein. For example a promotional report subsystem could be used to produce various reports on the effectiveness of a promotion. Further, the data used in generating such reports may be produced using any of the techniques described herein.

Figure 7:
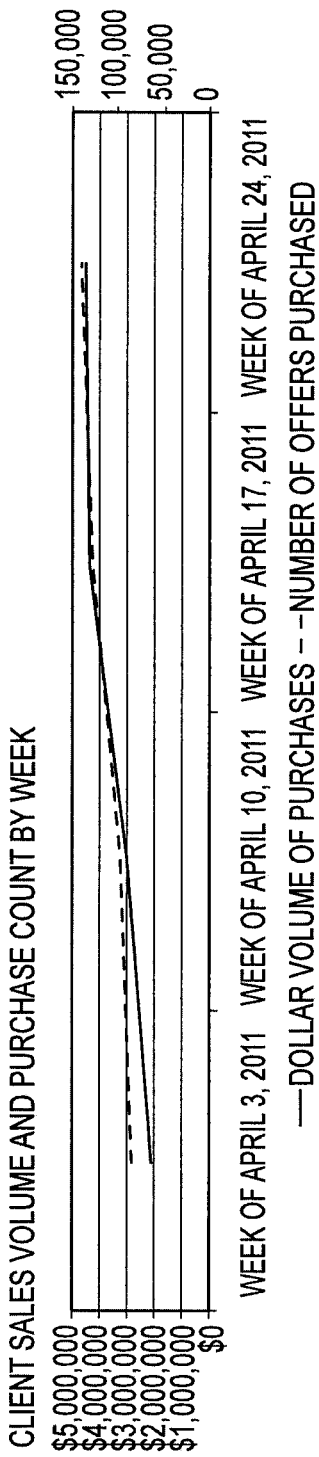
FIG. 7 illustrates one embodiment of a report showing client sales volume and purchase count by week.

FIG. 7 illustrates one embodiment of a report 700 showing client sales volume and purchase count by week. Report 700 shows the total dollar volume of purchases of a promotion for a given time. For example, the promotion may be a prepaid discount that is purchased from a web site. A graph 702 shows the total volume of such prepaid discounts purchased from the web site by week. Graph 704 shows the total number of such prepaid discounts that were purchased during the same time. In this way, a graphical display is provided to quickly illustrate the total amount of promotional offers that were purchased, both in terms of dollar volume and number.

Figure 8:
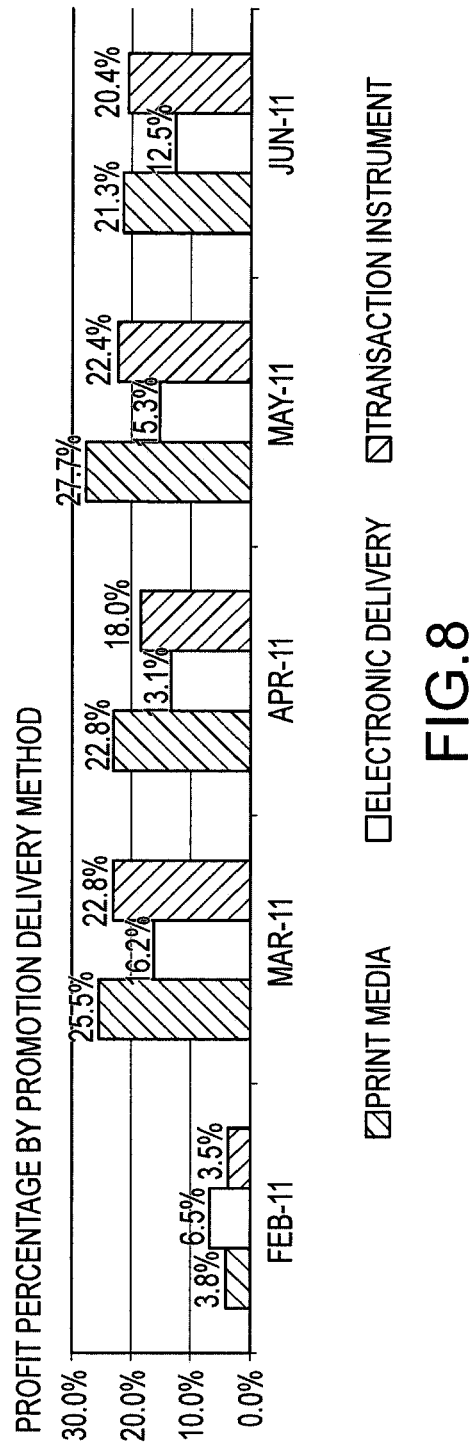
FIG. 8 illustrates another embodiment of a report showing profit percentage by promotion delivery method.

FIG. 8 illustrates a report 800 showing profit percentage by promotion delivery method. For example, the promotion may be delivered using printed mater, electronically or by a transaction instrument, such as a card. The profit made when selling the promotion may be calculated by determining the total revenue collected from offering the promotion less the cost of the promotion. The cost can include both the cost of the offer and the delivery method. For instance, if the promotion was a prepaid offer for a card to purchase a television for $200, the profit would be the revenue collected at the point of sale, less the $200 and less the cost to deliver the card to the purchaser.

Figure 9:
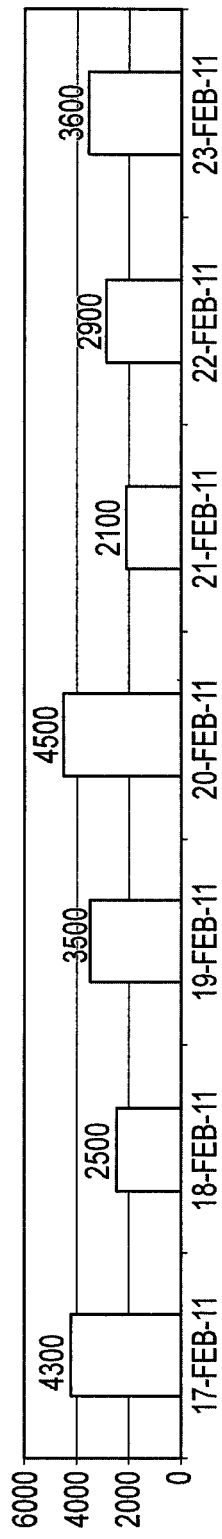
FIG. 9 illustrates a further embodiment of a report showing the frequency of promotion redemptions.

FIG. 9 illustrates a report 900 showing the frequency of promotion redemptions. The frequency is based on the date when the promotion was first accepted or purchased and shows the total number of redemptions by day following initiation of the offer. In this way, a graphical display shows how many accepted promotions are redeemed over time.

Figure 10:
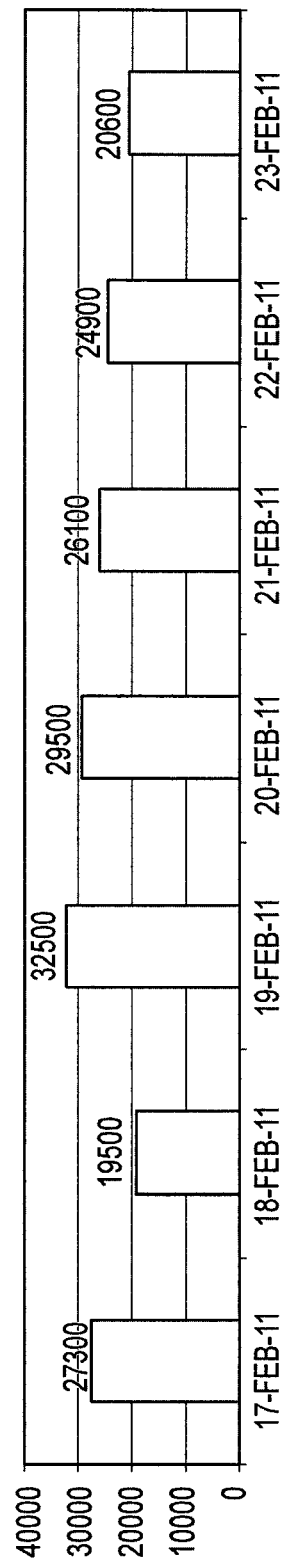
FIG. 10 illustrates still another embodiment of a report showing total spending from redemptions of a promotion.

FIG. 10 illustrates a report 1000 showing total spending from redemptions of a promotion. For instance, report 1000 shows the total dollar volume collected at the point of sale for the same time period of FIG. 9 when redeeming a promotion. This may include the price of the promotional item as well as other purchases made at the same time. This permits a merchant to see whether items in addition to the promotional item are purchased when the consumer redeems the promotion.

Figure 11:
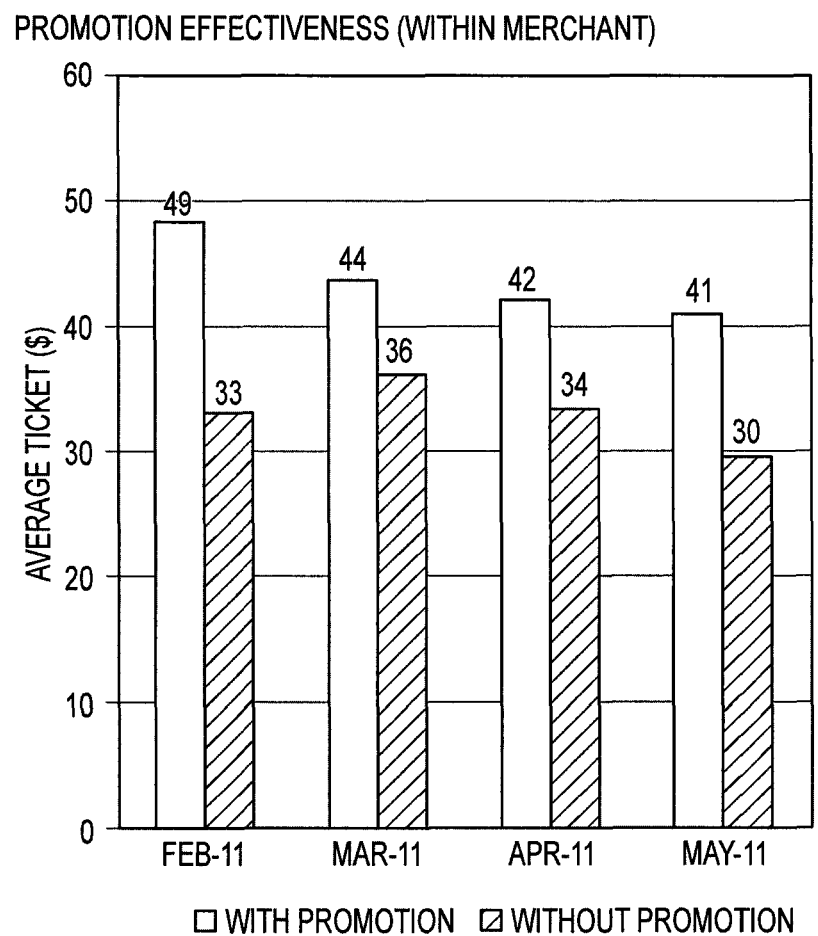
FIG. 11 illustrates another embodiment of a report showing the effectiveness of a promotion for a given merchant.

FIG. 11 illustrates a report 1100 showing the effectiveness of a promotion for a given merchant. Report 1100 shows the average amount collected at the point of sale for purchases made when using a promotional identifier and without the use of the indenture. This is for the same merchant providing the offer. This shows whether customers who come into a store with a promotion spend more or less than customers who make purchases without an identifier.

Figure 12:
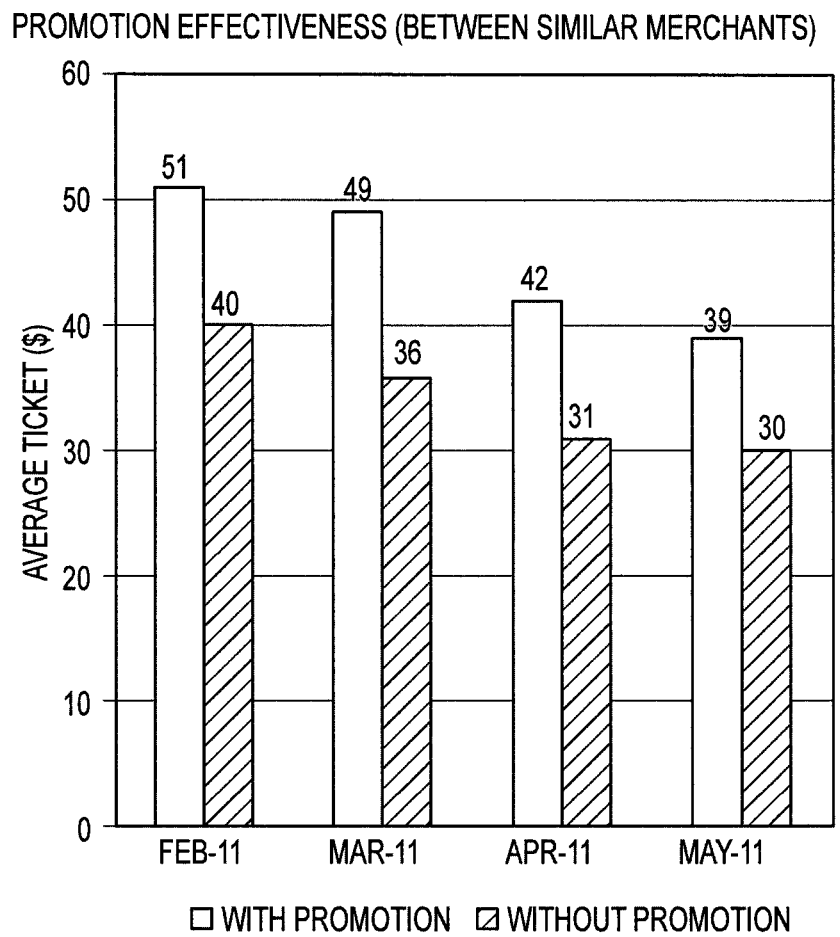
FIG. 12 illustrates a further embodiment of a report showing the effectiveness of a promotion between similar merchants.

FIG. 12 illustrates a report 1200 that is similar to report 1100 except that is shows the effectiveness of a promotion between similar merchants. In other words, report 1200 shows the amount consumers spend when redeeming a promotion at merchants who are similar to the merchant requesting the report as well as purchases made without using a promotion. For example, the merchant may be a shoe store. Report 1200 shows the effectiveness of a promotion offered by a competitor shoe store to show whether that promotion was effective.

Figure 13:
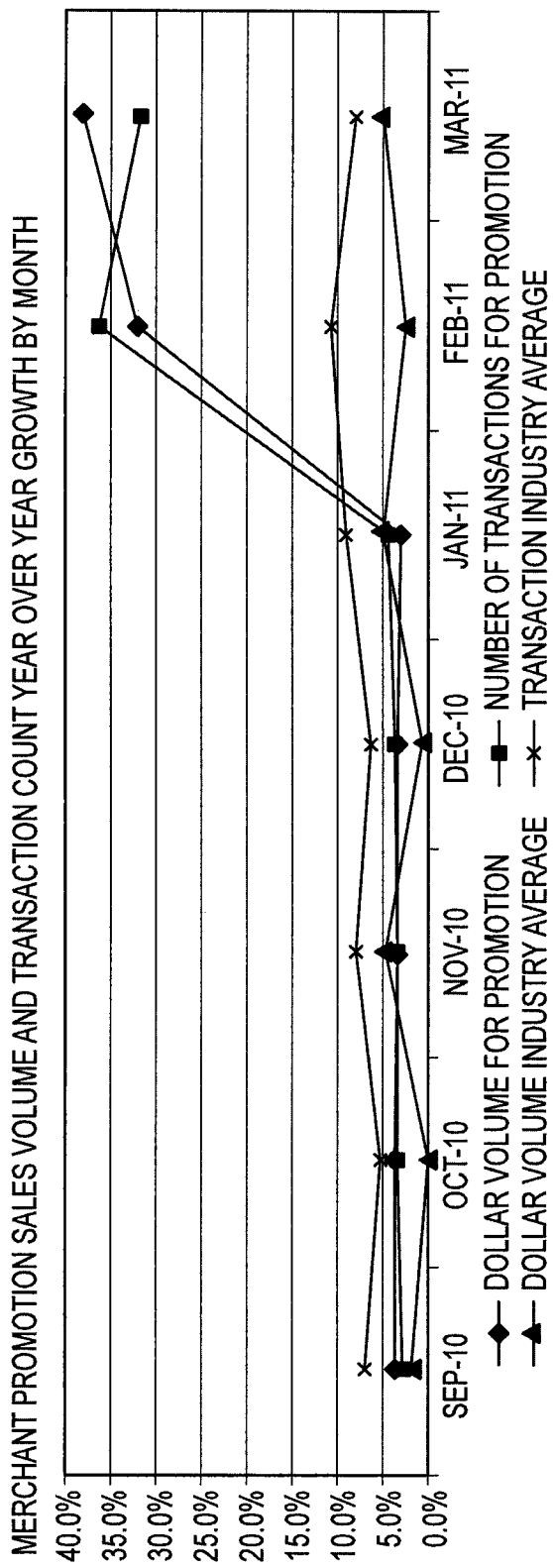
FIG. 13 illustrates still a further embodiment of a report showing transaction and volume growth from year to year when using a promotion.

FIG. 13 illustrates a report 1300 showing transaction and volume growth from year to year when using a promotion. For example, graph 1302 shows the dollar volume growth for transactions involving the use of a promotional identifier from year to year. Graph 1304 shows the industry average dollar volume growth for the same time periods (without using a promotion). Graph 1306 shows the percentage growth in terms of number of transactions from year to year when using a promotional identifier, while graph 1308 shows the industry average for the same time. This permits a merchant to see whether the same promotion is more or less effective from year to year, such as a promotion offered each year near Easter.

Figure 14:
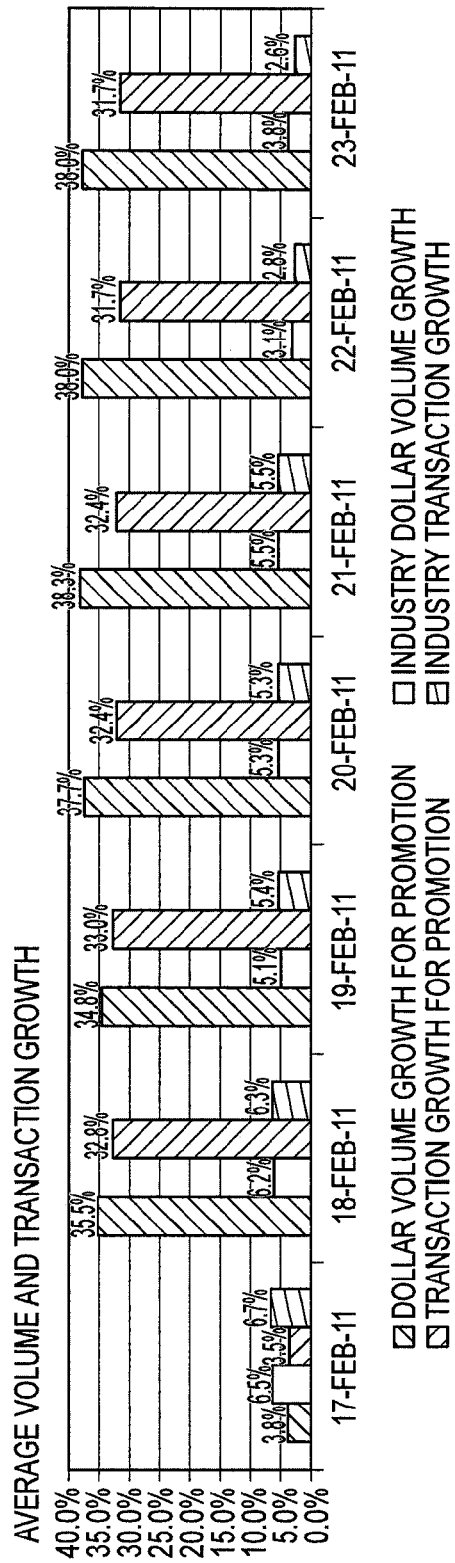
FIG. 14 illustrates a report showing the average volume and transaction growth resulting from the use of a promotion.

FIG. 14 illustrates a report 1400 showing the average volume and transaction growth from year to year resulting from the use of a promotion. Report 1400 is a series of bar graphs depicting the results similar to report 1300 but in a different format. For example, graph 1402 shows the dollar volume growth for transactions involving the use of a promotional identifier from year to year. Graph 1404 shows the industry average dollar volume growth for the same day (without using a promotion). Graph 1406 shows the percentage growth in terms of number of transactions from year to year when using a promotional identifier, while graph 1408 shows the industry average for the same time.

Figure 15:
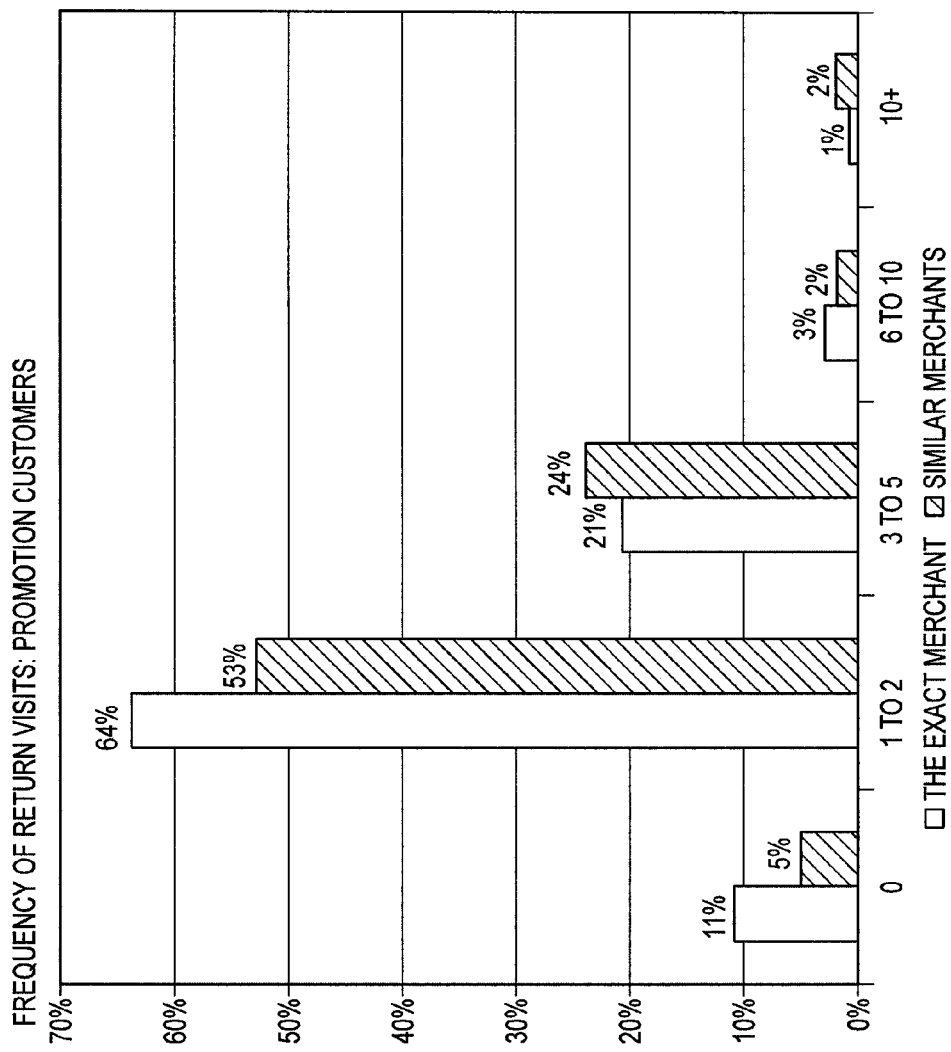
FIG. 15 illustrates a report showing the frequency of return visits for promotion customers.

FIG. 15 illustrates a report 1500 showing the frequency of return visits for promotion customers. This is categorized by discrete numbers of visits. For example, report 1500 shows the percentage of customers who previously redeemed a promotion with a given merchant and then who returned 0 times, 1-2 times, 3-5 times, 6-10 times and 10 or more times to the same merchant. Report 1500 further shows the percentage of customers who redeemed a promotion with similarly situated merchants and then returned to those merchants for subsequent purchases. This permits a merchant to see how effective its promotion was in generating repeat customers compared to similarly situated merchants who also offered similar promotions.

Figure 16:
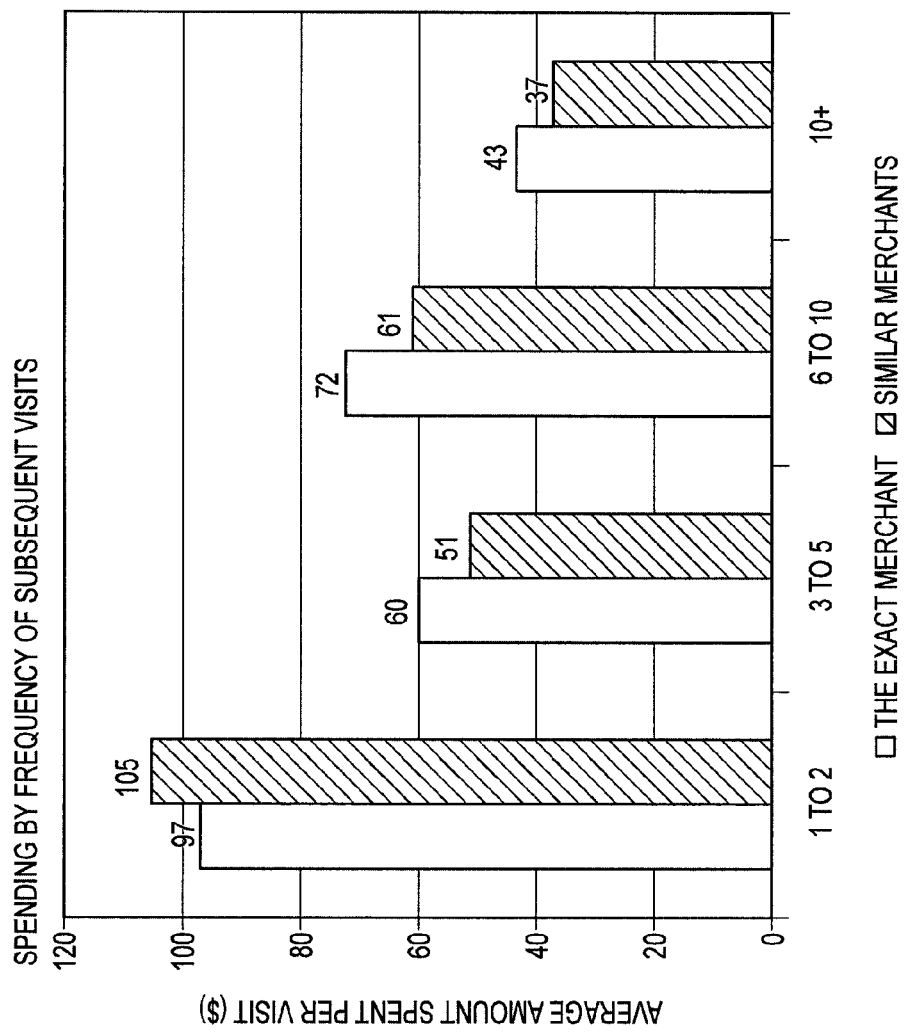
FIG. 16 illustrates a report showing the amount of spending by frequency of visits following a redemption.

FIG. 16 illustrates a report 1600 that is similar to report 1500 except that report 1600 shows the amount of money spent by frequency of visits following a redemption, both for the same merchant and for different merchants. This permits the merchant to see the average amount spent per customer when return visits are made.

Figure 17:
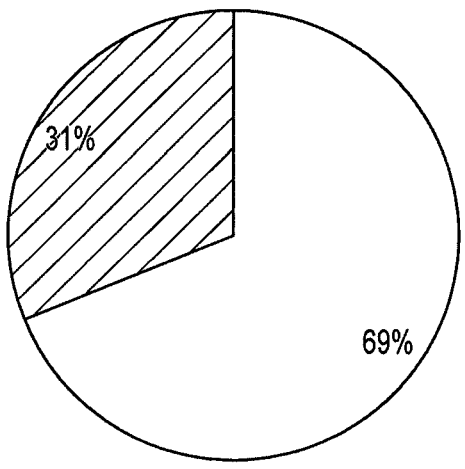
FIG. 17 illustrates a report showing purchases following a redemption using the same account used to purchase the promotion.

FIG. 17 illustrates a report 1700 showing purchases following a redemption using the same account used to purchase the promotion. For example, the promotion may comprise a prepaid discount that was purchased by a credit card. Report 1700 would then show the percentage of redemption transactions or subsequent transactions with the same merchant where that same credit card was used.

Figure 18:
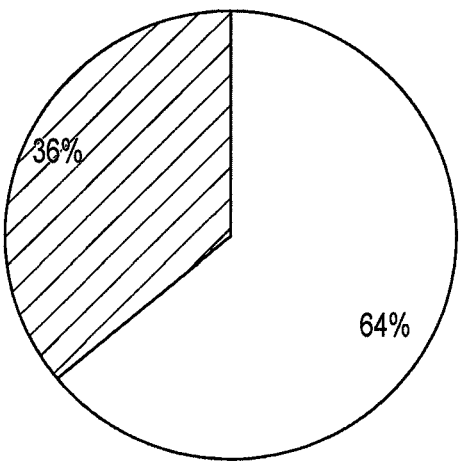
FIG. 18 is a report showing customers who return to the same merchant following a redemption.

FIG. 18 shows a report 1800 showing customers who return to the same merchant or a different merchant following a redemption. A customer is defined as loyal if that customer shops only at the merchant where the promotion was redeemed. A non-loyal customer can shop at other merchants following a redemption. This permits a merchant to see how many people who participate in a promotion will return exclusively to that merchant.

Figure 19:
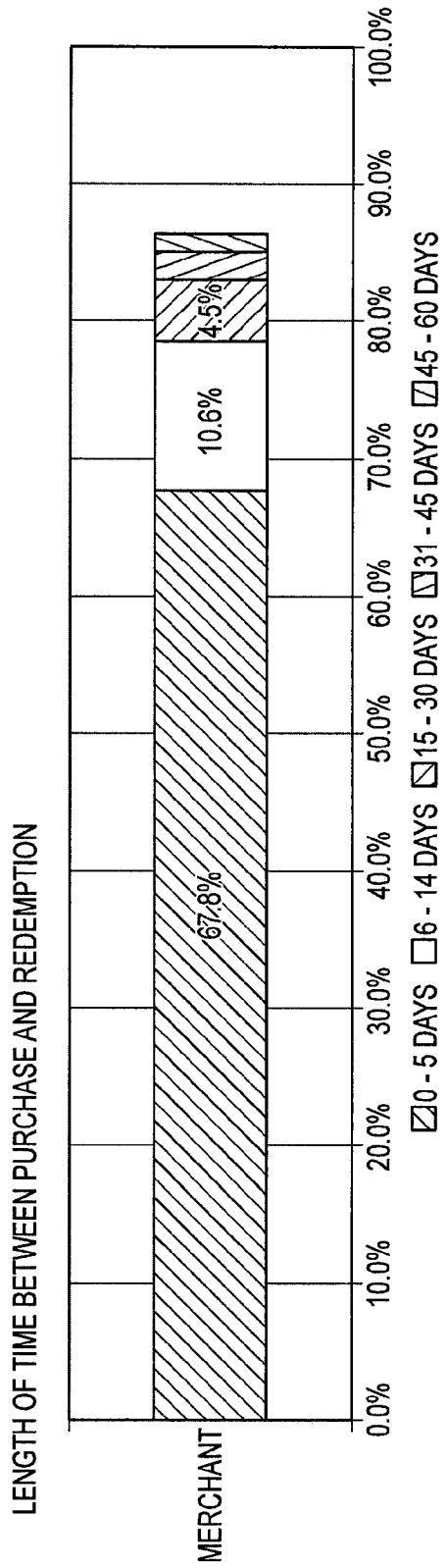
FIG. 19 illustrates a report showing the length of time between purchase of an offer and redemption of the offer.

FIG. 19 shows a report 1900 showing the length of time between the purchase of a promotion and the redemption of that promotion. For example, report 1900 shows the number of days it takes following the purchase of a prepaid discount for that discount to be redeemed. This is done based on the percentage of the number of prepaid discounts that were sold so the merchant can see what percentage of the total prepaid discounts were redeemed during specified time frames.

In one particular aspect, the effectiveness of a promotion may be illustrated by comparing POS data from a merchant offering or promotion with a control group of merchants, who, for the most part, are not offering a similar type of promotion. The POS data may be collected by a computer system similar to any of those described herein. The computer system may aggregate the data, provide calculations and generate outputs suitable for producing reports similar to any of the other systems described herein. Typically, the POS device will capture information on the merchant offering the promotion. In some cases, the merchant offering the promotion may use a third part to market the promotion, such as an Internet deal site merchant, similar to other embodiments described herein. In such cases, the customer purchases a prepaid offer (or receives a coupon) and then redeems this at the merchant's POS terminal. Information on the transaction, including the merchant, the promotion, the transaction amount, time of day, and the like are collected and transmitted to the computer system for aggregation and/or processing. The computer system also collects POS transaction data from other merchants that typically are not participating in a similar promotion. Preferably, these merchants sell the same types of goods or service as the merchant offering the promotion so that the comparison will be between similar goods or services. Classification schemes can include a merchant code, such as an MCC, or other classifier. The non-participating merchant POS transaction data is aggregated in some cases so that the promotion merchant will not know the identity of any one merchant used in producing the comparison reports. Of course, if permission were granted, the comparison could be performed between the promotion merchant and a specifically identified merchant. However, to protect anonymity the non-participating merchant, POS transaction data is aggregated prior to the comparison, which typically involves the use of similarly situated merchants in terms of types of goods or services, location of stores, size of stores, and the like.

A wide variety of reports may be generated showing comparisons of participating and non-participating merchants in order to show the effectiveness of a promotion. Further, as with other embodiments described herein, reports may also be generated showing the effectiveness of the promotion by evaluating transaction data involving only the participating merchant, such as for example, sales volume, average ticket, loyalty (whether the customer returns or shops elsewhere), and the like.

Figure 20:
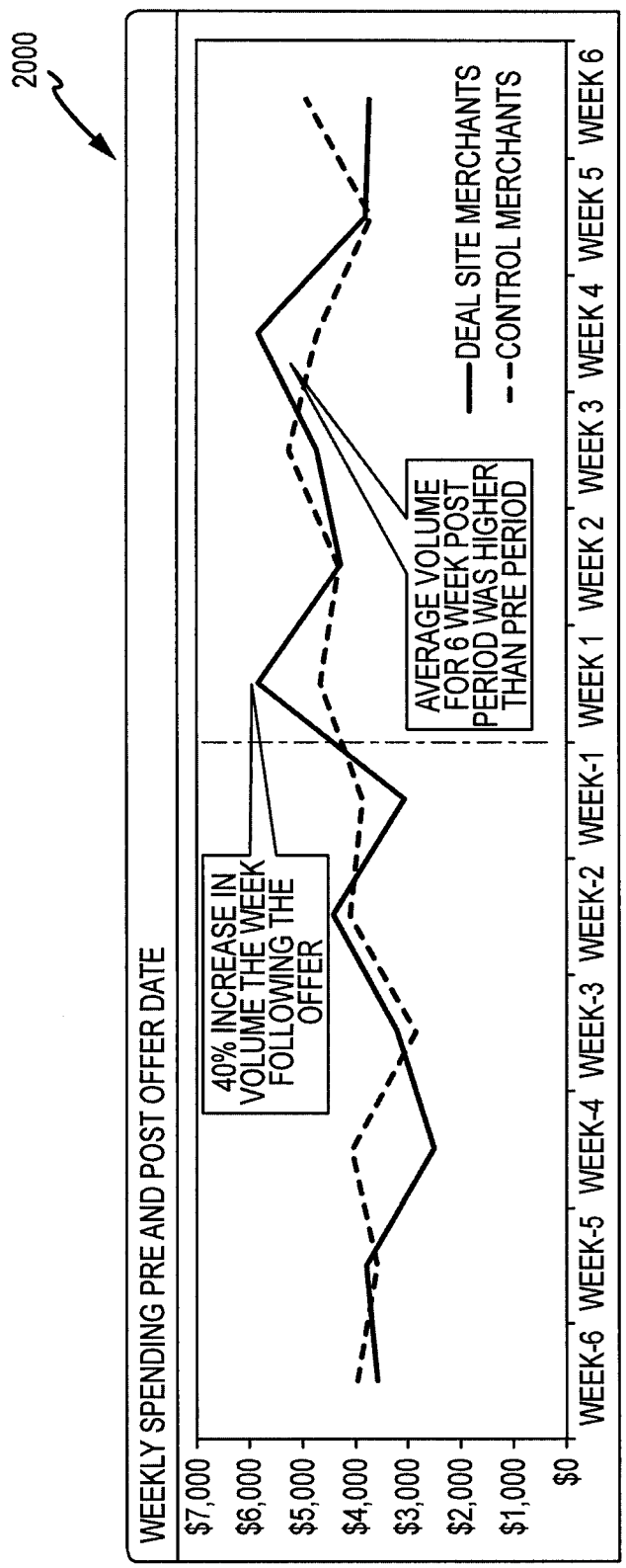
FIG. 20 is a report showing a comparison of dollar volume sales before and after an offer between a deal site merchant and an aggregation of control merchants.

FIG. 20 is an example of one report 2000 showing a comparison of total sales volume before and after offering a promotion. Report 2000 may be produced on a computer display screen, in other digital form, on paper or the like. The comparison is between a deal site merchant (the merchant offering the promotion) and a group of similarly situated control merchants. The comparison shows that the weekly sales volume between the two are generally the same until just after the deal site merchant offered a promotion. At that point, sales volume in dollars increased about 40%. For about six weeks following the offer, the average dollar volume was higher than before the offer.

Figure 21:
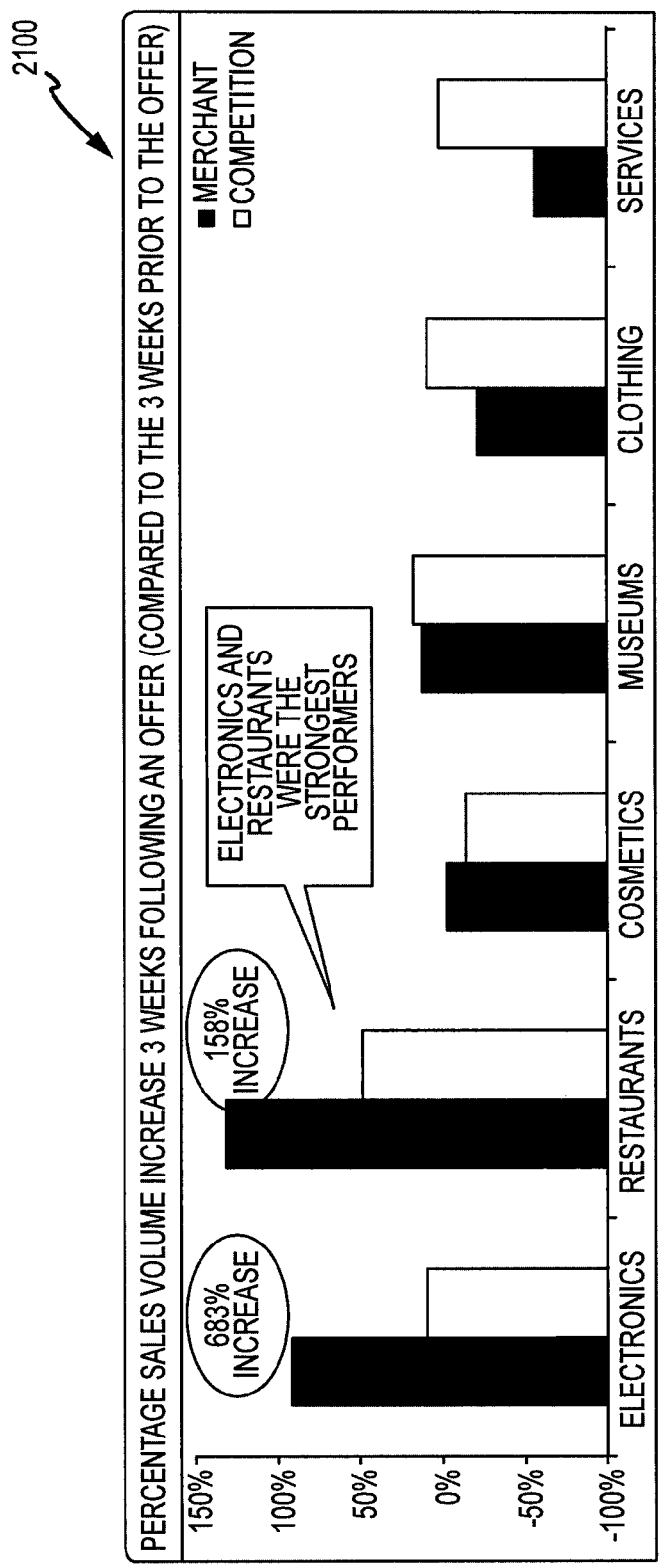
FIG. 21 is a report showing the effectiveness of promotions across different types of goods and services.

FIG. 21 illustrates a report 2100 showing the effectiveness of a given promotion on the type of good or service being offered. This report may be produced in various formats similar to other embodiments. For example, when a promotion merchant offers a promotion on electronics, a comparison may be produced showing the effectiveness of the promotion as compared to other merchants who also sell electronics. Similar graphs may be shown for a variety of goods or services, such as restaurants, cosmetics, museums, clothing, services and the like. In other words, FIG. 21 illustrates promotions offered by a variety of merchants involved in selling different goods or services, and how those promotions fared in comparison to merchants selling similar goods or services. The goods or services may be classified by a merchant classification code, such as an MCC, or other classification scheme. For the non-participating merchants, the POS transaction data may be aggregated similar to other embodiments.

Figure 22:
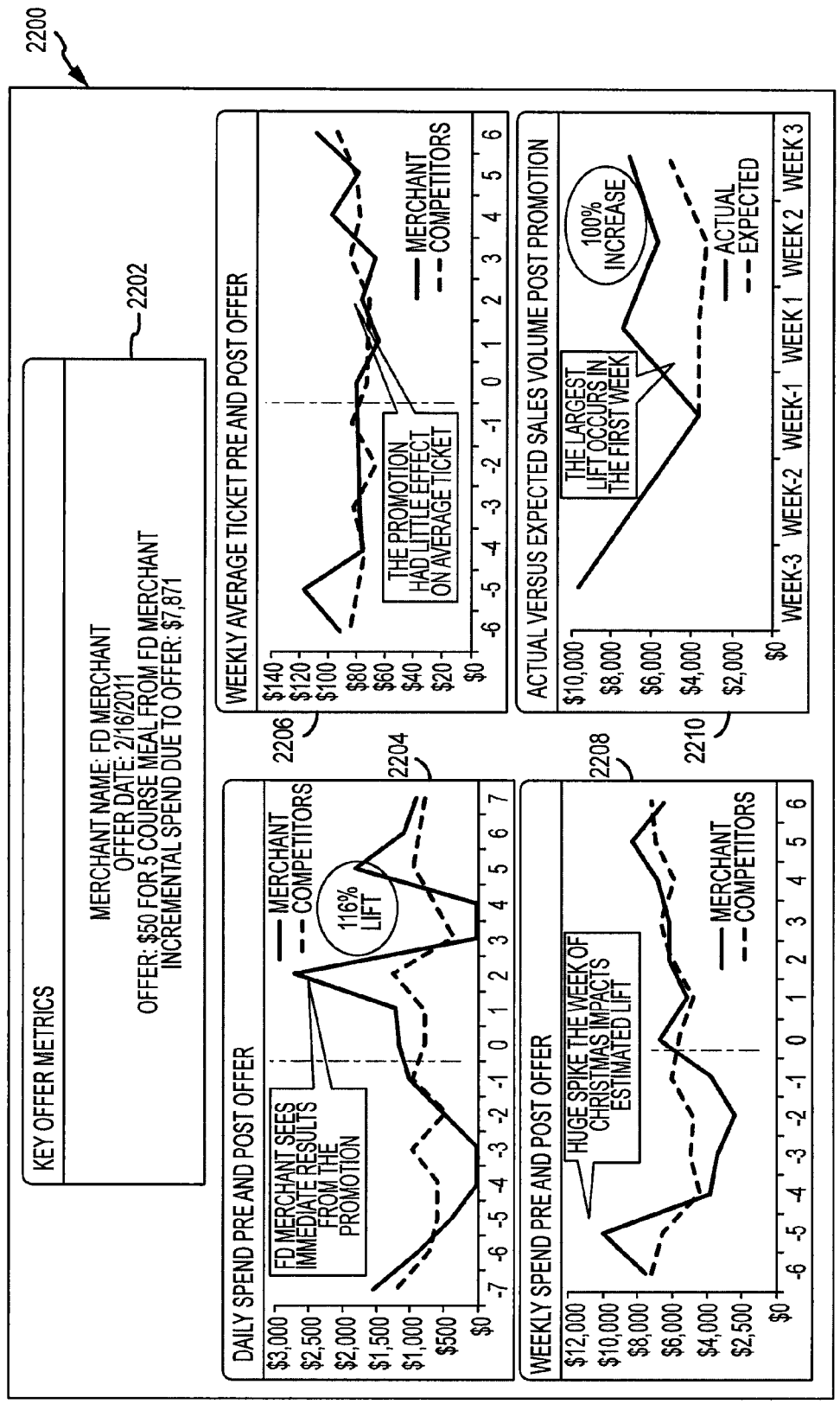
FIG. 22 is a display screen showing various reports that illustrate the results of a promotion offered by a deal site merchant.

FIG. 22 illustrates a report 2200 showing various comparisons relating to the effectiveness of an offer. It will be appreciated that the various comparisons could be broken out in separate reports. Further, report 2200 may be provided in a variety of formats, including as a display screen on a computer, other digital form, on paper or the like. In this specific example, a deal was offered on an Internet site. The deal was to prepay $50 in order to receive a 5 course meal at the promotion merchant location. A region 2202 displays the salient terms of the offer along with a summary of the effectiveness of the promotion in terms of past performance for the same promotion merchant. For example, the incremental sales volume at the merchant during the week following the offer increased $7,871.

Region 2204 shows the daily spend at the promotion merchant (in terms of total dollar volume sales) on a daily basis as compared to an aggregation of similarly situated merchants. The comparison may be performed using POS transaction data for the promotion merchant as well as aggregated data for similarly situated merchants similar to that previously described. Region 2204 shows that sales at the promotion merchant and similarly situated merchants generally track each other until about two days after the offer when sales increased 116% relative to the similarly situated merchant sales. The store was closed on day three, but high sales resumed on days four and five.

Region 2208 is a report similar to that shown in region 2204 except that sales volume is shown on a weekly basis instead of a daily basis. Also, shown is an estimated lift that is the difference between what the actual data produced versus what was expected. In other words, a comparison is shown between actual sales and the expected sales.

Region 2206 is a report similar to that shown in region 2204 except that the comparison involves weekly average ticket price, rather than daily total spend. The average ticket price is the average amount a customer spends when making a transaction to purchase goods or services. As shown, the promotion had little impact on how much a customer spent at the promotion merchant in comparison with what customers spent at similarly situated merchants.

Region 2210 is a report showing actual sales volume versus an estimated sales volume for the promotion merchant. The estimated sales volume is calculated using an Analysis of Covariance that models the behavior of the "comparison" group and the target merchant to predict what sales would have been if no promotion had taken place.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with-or without-certain features for ease of description and to illustrate exemplary features, the various components and/or features described herein with respect to a particular embodiment can be substituted, added, and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A computerized method for calculating the effectiveness of a promotion, the method comprising:
    generating by a web site computer at least one promotional identifier that identifies a promotion being offered by a promotion merchant, wherein the promotional identifier is adapted to be entered into a point of sale terminal of the promotion merchant when redeeming the promotion;
    receiving at a host computer system transaction data from a plurality of point of sale terminals that are associated with a plurality of merchants, wherein the point of sale terminals are separate from the web site computer and are physically located in stores where goods are physically offered for sale, wherein the transaction data comprises a merchant identifier for each of the merchants and a transaction amount for each transaction involving the merchants, and wherein one of the merchants comprises a promotion merchant that is offering the promotion involving transactions made with the promotion merchant, and wherein the transaction data further comprises the promotional identifier for transactions where the promotion was redeemed by entering the promotional identifier that was generated by the web site computer into the point of sale terminal;
    aggregating a portion of the transaction data into control merchant aggregated data involving control merchants, wherein the control merchant aggregated data comprises transaction data obtained other than from the promotion merchant;
    calculating by the host computer system a characteristic of the purchases, both for transactions involving the promotion merchant and for the control merchants;
    providing an output showing a comparison of the calculation, wherein the report shows the comparison of a characteristic of the purchases made using the promotional identifier and those made without using the promotional identifier.

2. A method as in claim 1, wherein the output comprises a report comparing the average dollar value of purchases made at the promotion merchant with the other merchants over a certain time frame.

3. A method as in claim 1, wherein the output comprises a report comparing the dollar sales volume of purchases made at the promotion merchant with the other merchants over a certain time frame.

4. A method as in claim 1, wherein each merchant identifier is associated with a classification of goods or services offered by the merchant, wherein each of the merchants has the same classification of goods, and wherein the report shows the classification.

5. A method as in claim 1, wherein the output comprises a reporting show a percentage difference in the characteristic of the purchases between the transactions with the promotion merchant and the control merchants.

6. A method as in claim 1, wherein the certain time comprises both before and after the promotion begins, and wherein the certain time is selected from a group consisting of daily or weekly.

7. A method as in claim 1, further comprising providing an estimated expected sales volume due to the promotion, and further comprising showing a comparison of the estimated expected sales volume and an actual sales volume for the promotion merchant.

8. A method as in claim 1, wherein the transaction data from the promotion merchant includes promotional identifiers, and further comprising generating a report showing the average dollar value of purchases made using the promotional identifiers and those made without using the promotional identifiers.

9. A method as in claim 1, wherein the transaction data from the promotion merchant includes promotional identifiers, and further comprising generating a report showing the total dollar value of purchases made using the promotional identifiers over a specified time and those made without using the promotional identifiers.

10. A system for reporting the effectiveness of a promotion according to point-of-sale (POS) data, the system comprising:
    an aggregation subsystem, communicatively coupled with a POS network comprising a plurality of POS terminals, and configured to aggregate POS datasets from the plurality of POS terminals, each POS terminal being configured to collect transaction data as a function of transactions effectuated via the POS terminal, wherein the POS terminals are physically located in stores where goods are physically offered for sale, wherein the transaction data comprises a merchant identifier for each of the merchants and a transaction amount for each transaction involving the merchants, and wherein one of the merchants comprises a promotion merchant that is offering a promotion involving transactions made with the merchant, wherein at least some of the transaction data further comprises a promotional identifier for at least some of the transactions, wherein the promotional identifier identifies a promotion being offered by a promotion merchant and was entered into the POS terminal where the promotion was redeemed, and wherein the aggregation subsystem is configured to aggregate a portion of the transaction data into control merchant aggregated data involving control merchants, wherein the control merchant aggregated data comprises transaction data obtained other than from the promotion merchant;

a data storage subsystem having a physical memory, communicatively coupled with the aggregation subsystem and configured to store the aggregated POS data from the plurality of POS terminals;

a promotional analysis processing subsystem having at least one computer processor, communicatively coupled with the POS data store, and configured to:

calculate using the processor a characteristic of the purchases, both for transactions involving the promotion merchant and for the control merchants; and a reporting subsystem, communicatively coupled with the promotional analysis processing subsystem, and configured to output graphical report data as a function of the promotional data in response to the reporting request to show a comparison of the calculation, the graphical report data configured to be displayed on a user device, wherein the report shows the comparison of a characteristic of the purchases made using the promotional identifier and those made without using the promotional identifier.

11. A system as in claim 10, wherein the reporting subsystem is configured to output a report showing a comparison of at least one of the average dollar value of purchases and the dollar sales volume of purchases made at the promotion merchant with the other merchants over a certain time frame.

12. A system as in claim 10, wherein each merchant identifier is associated with a classification of goods or services offered by the merchant, wherein each of the merchants has the same classification of goods, and wherein the report shows the classification.

13. A system as in claim 10, wherein the reporting subsystem is configured to output a report showing a percentage difference in the characteristic of the purchases between the transactions with the promotion merchant and the control merchants.

14. A system as in claim 10, wherein the certain time comprises both before and after the promotion begins.

15. A system as in claim 10, wherein the data storage subsystem is configured to store an estimated expected sales volume due to the promotion, and wherein the reporting subsystem is configured to show a comparison of the estimated expected sales volume and an actual sales volume for the promotion merchant.

16. A system as in claim 10, wherein the transaction data from the promotion merchant includes promotional identifiers, and wherein the reporting subsystem is configured to generate a report showing the average dollar value of purchases made using the promotional identifiers and those made without using the promotional identifiers.

17. A system as in claim 10, wherein the transaction data from the promotion merchant includes promotional identifiers, and wherein the reporting subsystem is configured to generate a report showing the total dollar value of purchases made using the promotional identifiers over a specified time and those made without using the promotional identifiers.

18. A system for reporting the effectiveness of a promotion according to point-of-sale (POS) data, the system comprising:

an aggregation subsystem, communicatively coupled with a POS network comprising a plurality of POS terminals, and configured to aggregate POS datasets from the plurality of POS terminals, each POS terminal being configured to collect transaction data as a function of transactions effectuated via the POS terminal, the POS dataset for each of the POS terminals comprising the transaction data, including a promotional identifier that was previously generated by a web site computer, that identifies a promotion being offered by a promotion merchant, and that is entered into one of the POS terminals when making a purchase at the promotion merchant when redeeming the promotion;

a data storage subsystem having a physical memory, communicatively coupled with the aggregation subsystem and configured to store the aggregated POS data from the plurality of POS terminals;

a promotional analysis processing subsystem having at least one computer processor, communicatively coupled with the POS data store, and configured to:

identify using the processor promotional data that comprises purchases that were made using a promotional identifier and purchases made without the use of the promotional identifier; and a reporting subsystem, communicatively coupled with the promotional analysis processing subsystem, and configured to output graphical report data as a function of the promotional data in response to the reporting request, the graphical report data configured to be displayed on a user device to show the effectiveness of the promotion by a comparison of a characteristic of the purchases made using the promotional identifier and those made without using the promotional identifier; and wherein the promotion comprises a pre-paid discount, and wherein the reporting subsystem is configured to produce a report showing whether an account used to purchase the pre-paid discount was also used to make purchases when using the promotional identifier.

19. A system as in claim 18, wherein the reporting subsystem is configured to produce a report showing the frequency of purchases made over time using the promotional identifiers.

20. A system as in claim 18, wherein the reporting subsystem is configured to produce a report showing the frequency of return visits to the same merchant where the purchases were made using the promotional identifier and for visits to similar merchants where the promotional identifiers were not used.

21. A system as in claim 18, wherein the reporting subsystem is configured to produce a report showing the average amount spent during return visits to the same merchant where the purchase was made using the promotional identifier versus purchases made during visits to similarly situated merchants, the similarly situated merchants comprising merchants offering similar types of goods and services, merchants having similar locations, and merchants having similarly sized stores.

22. A system as in claim 18, wherein the reporting subsystem is configured to produce a report showing the total amount spent for purchases made at a merchant location where the promotional identifier was used.

23. A system as in claim 18, wherein the reporting subsystem is configured to produce a report showing how many people who made purchases using the promotional identifier at a given merchant do not make any purchases with different merchants in a same industry.

24. A system as in claim 18, wherein the promotion comprises a pre-paid discount, and wherein the reporting subsystem is configured to produce a report showing the average length of time between the purchase of the pre-paid discounts and purchases made using the promotional identifier.

25. A system for reporting the effectiveness of a promotion according to point-of-sale (POS) data, the system comprising:
    an aggregation subsystem, communicatively coupled with a POS network comprising a plurality of POS terminals, and configured to aggregate POS datasets from the plurality of POS terminals, each POS terminal being configured to collect transaction data as a function of transactions effectuated via the POS terminal, the POS dataset for each of the POS terminals comprising the transaction data, including a promotional identifier that was previously generated by a web site computer, that identifies a promotion being offered by a promotion merchant, and that is entered into one of the POS terminals when making a purchase at the promotion merchant when redeeming the promotion;
    a data storage subsystem having a physical memory, communicatively coupled with the aggregation subsystem and configured to store the aggregated POS data from the plurality of POS terminals;
    a promotional analysis processing subsystem having at least one computer processor, communicatively coupled with the POS data store, and configured to:
    identify using the processor promotional data that comprises purchases that were made using a promotional identifier and purchases made without the use of the promotional identifier; and
    a reporting subsystem, communicatively coupled with the promotional analysis processing subsystem, and configured to output graphical report data as a function of the promotional data in response to the reporting request, the graphical report data configured to be displayed on a user device to show the effectiveness of the promotion by a comparison of a characteristic of the purchases made using the promotional identifier and those made without using the promotional identifier; and
    wherein the reporting subsystem is configured to produce a report showing the frequency of return visits to the same merchant where the purchases were made using the promotional identifier and for visits to similar merchants where the promotional identifiers were not used.

26. A system for reporting the effectiveness of a promotion according to point-of-sale (POS) data, the system comprising:
    an aggregation subsystem, communicatively coupled with a POS network comprising a plurality of POS terminals, and configured to aggregate POS datasets from the plurality of POS terminals, each POS terminal being configured to collect transaction data as a function of transactions effectuated via the POS terminal, the POS dataset for each of the POS terminals comprising the transaction data, including a promotional identifier that was previously generated by a web site computer, that identifies a promotion being offered by a promotion merchant, and that is entered into one of the POS terminals when making a purchase at the promotion merchant when redeeming the promotion;
    a data storage subsystem having a physical memory, communicatively coupled with the aggregation subsystem and configured to store the aggregated POS data from the plurality of POS terminals;
    a promotional analysis processing subsystem having at least one computer processor, communicatively coupled with the POS data store, and configured to:
    identify using the processor promotional data that comprises purchases that were made using a promotional identifier and purchases made without the use of the promotional identifier; and
    a reporting subsystem, communicatively coupled with the promotional analysis processing subsystem, and configured to output graphical report data as a function of the promotional data in response to the reporting request, the graphical report data configured to be displayed on a user device to show the effectiveness of the promotion by a comparison of a characteristic of the purchases made using the promotional identifier and those made without using the promotional identifier; and
    wherein the reporting subsystem is configured to produce a report showing the average amount spent during return visits to the same merchant where the purchase was made using the promotional identifier versus purchases made during visits to similarly situated merchants, the similarly situated merchants comprising merchants offering similar types of goods and services, merchants having similar locations, and merchants having similarly sized stores.

27. A system for reporting the effectiveness of a promotion according to point-of-sale (POS) data, the system comprising:
    an aggregation subsystem, communicatively coupled with a POS network comprising a plurality of POS terminals, and configured to aggregate POS datasets from the plurality of POS terminals, each POS terminal being configured to collect transaction data as a function of transactions effectuated via the POS terminal, the POS dataset for each of the POS terminals comprising the transaction data, including a promotional identifier that was previously generated by a web site computer, that identifies a promotion being offered by a promotion merchant, and that is entered into one of the POS terminals when making a purchase at the promotion merchant when redeeming the promotion;
    a data storage subsystem having a physical memory, communicatively coupled with the aggregation subsystem and configured to store the aggregated POS data from the plurality of POS terminals;
    a promotional analysis processing subsystem having at least one computer processor, communicatively coupled with the POS data store, and configured to:
    identify using the processor promotional data that comprises purchases that were made using a promotional identifier and purchases made without the use of the promotional identifier; and
    a reporting subsystem, communicatively coupled with the promotional analysis processing subsystem, and configured to output graphical report data as a function of the promotional data in response to the reporting request, the graphical report data configured to be displayed on a user device to show the effectiveness of the promotion by a comparison of a characteristic of the purchases made using the promotional identifier and those made without using the promotional identifier; and
    wherein the reporting subsystem is configured to produce a report showing how many people who made purchases using the promotional identifier at a given merchant do not make any purchases with different merchants in a same industry.

28. A system for reporting the effectiveness of a promotion according to point-of-sale (POS) data, the system comprising:
- an aggregation subsystem, communicatively coupled with a POS network comprising a plurality of POS terminals, and configured to aggregate POS datasets from the plurality of POS terminals, each POS terminal being configured to collect transaction data as a function of transactions effectuated via the POS terminal, the POS dataset for each of the POS terminals comprising the transaction data, including a promotional identifier that was previously generated by a web site computer, that identifies a promotion being offered by a promotion merchant, and that is entered into one of the POS terminals when making a purchase at the promotion merchant when redeeming the promotion;
- a data storage subsystem having a physical memory, communicatively coupled with the aggregation subsystem and configured to store the aggregated POS data from the plurality of POS terminals;
- a promotional analysis processing subsystem having at least one computer processor, communicatively coupled with the POS data store, and configured to:
- identify using the processor promotional data that comprises purchases that were made using a promotional identifier and purchases made without the use of the promotional identifier; and
- a reporting subsystem, communicatively coupled with the promotional analysis processing subsystem, and configured to output graphical report data as a function of the promotional data in response to the reporting request, the graphical report data configured to be displayed on a user device to show the effectiveness of the promotion by a comparison of a characteristic of the purchases made using the promotional identifier and those made without using the promotional identifier; and
- wherein the promotion comprises a pre-paid discount, and wherein the reporting subsystem is configured to produce a report showing the average length of time between the purchase of the pre-paid discounts and purchases made using the promotional identifier.

* * * * *